United States Patent
Van Lierop et al.

(10) Patent No.: US 10,877,263 B2
(45) Date of Patent: Dec. 29, 2020

(54) MIRROR DEVICE HAVING LEAF SPRING WITH OPENINGS

(71) Applicant: Infineon Technologies AG, Neubiberg (DE)

(72) Inventors: Hendrikus Van Lierop, Bj Weert (NL); Kaveh Samadi Khah, Nijmegen (NL)

(73) Assignee: Infineon Technologies AG

( * ) Notice: Subject to any disclaimer, the term of this patent is extended or adjusted under 35 U.S.C. 154(b) by 146 days.

(21) Appl. No.: 16/174,519

(22) Filed: Oct. 30, 2018

(65) Prior Publication Data

US 2019/0129163 A1  May 2, 2019

(30) Foreign Application Priority Data

Oct. 30, 2017 (DE) .......................... 10 2017 219 442

(51) Int. Cl.
*G02B 26/08* (2006.01)
*F16F 1/18* (2006.01)
*G02B 26/10* (2006.01)
*F16F 1/12* (2006.01)

(52) U.S. Cl.
CPC .......... *G02B 26/0833* (2013.01); *F16F 1/185* (2013.01); *G02B 26/105* (2013.01); *F16F 1/126* (2013.01); *F16F 2230/36* (2013.01)

(58) Field of Classification Search
CPC ........................ G02B 26/0833; G02B 26/105
USPC .................. 359/224.1, 225.1, 226.1, 872
See application file for complete search history.

(56) References Cited

U.S. PATENT DOCUMENTS

| 5,268,784 | A | * | 12/1993 | Chaya | G11B 7/08564 359/214.1 |
| 5,543,956 | A | * | 8/1996 | Nakagawa | G02B 26/085 310/36 |
| 7,187,100 | B2 | | 3/2007 | Fu | |
| 8,345,336 | B2 | * | 1/2013 | Krastev | G02B 26/0833 359/198.1 |
| 8,711,460 | B2 | | 4/2014 | Ueda et al. | |
| 2003/0174035 | A1 | | 9/2003 | Arima | |
| 2005/0231065 | A1 | | 10/2005 | Fu | |
| 2014/0300942 | A1 | * | 10/2014 | Van Lierop | B81B 3/007 359/199.2 |
| 2014/0327946 | A1 | | 11/2014 | Lierop et al. | |
| 2020/0132981 | A1 | * | 4/2020 | Van Lierop | G02B 6/3514 |

FOREIGN PATENT DOCUMENTS

| CN | 102067009 A | | 5/2011 |
| EP | 1528422 A1 | | 5/2005 |
| JP | 11002774 | * | 1/1999 |
| WO | 2005006052 A1 | | 1/2005 |
| WO | 2013111266 A1 | | 8/2013 |

* cited by examiner

*Primary Examiner* — Ricky D Shafer
(74) *Attorney, Agent, or Firm* — Design IP

(57) ABSTRACT

A mirror device includes a frame, a mirror body arranged in the frame and rotatable around a rotation, support beams connected between the mirror body and the frame and a leaf spring providing torsional stiffness with respect to a rotation of the mirror body around the rotational axis. The leaf spring has a maximum thickness that is smaller than a minimum width thereof, where the leaf spring has openings that reduce the thickness thereof or the penetrate the leaf spring in the thickness direction.

25 Claims, 19 Drawing Sheets

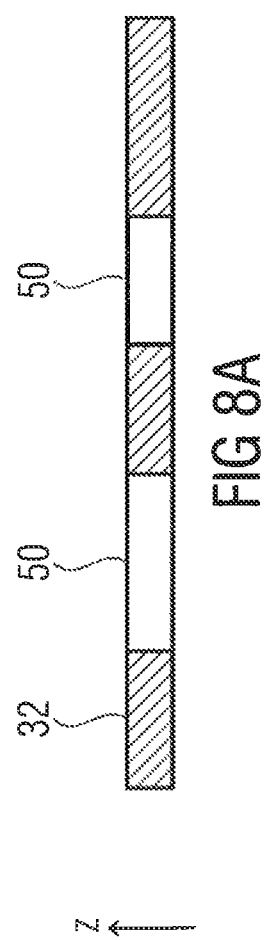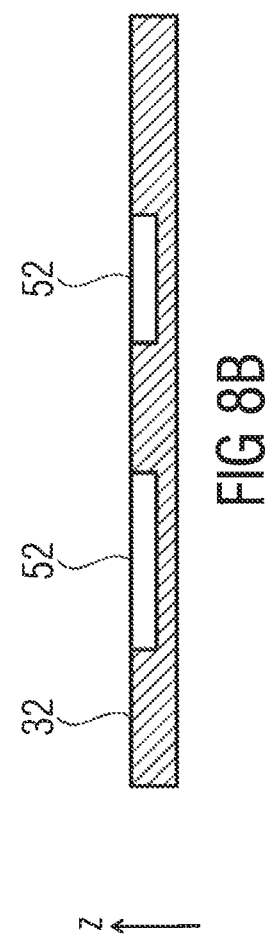

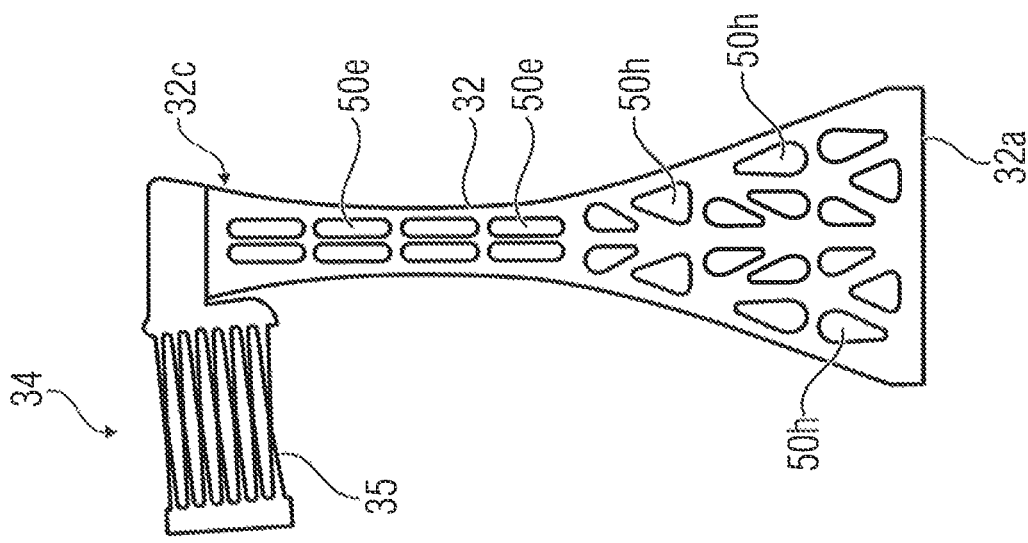
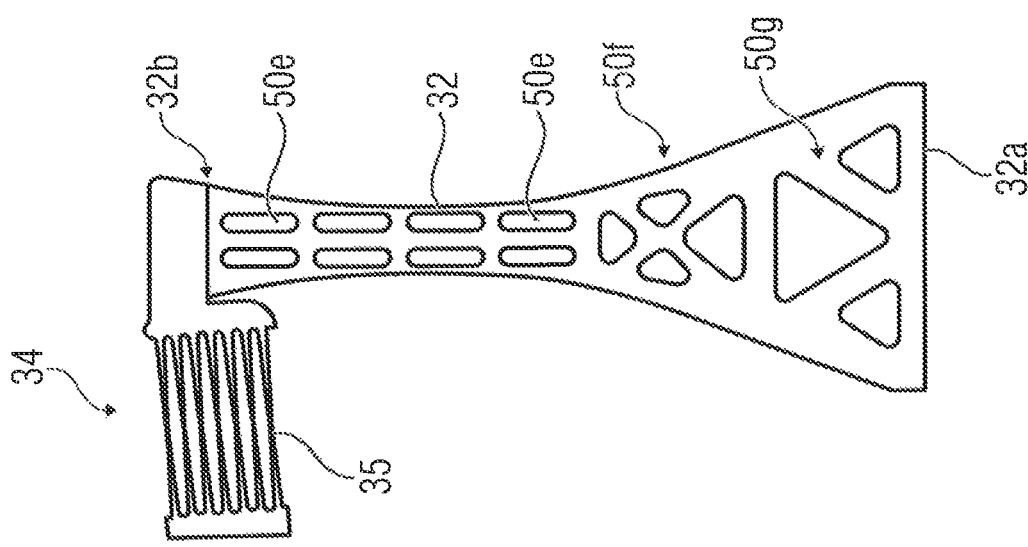
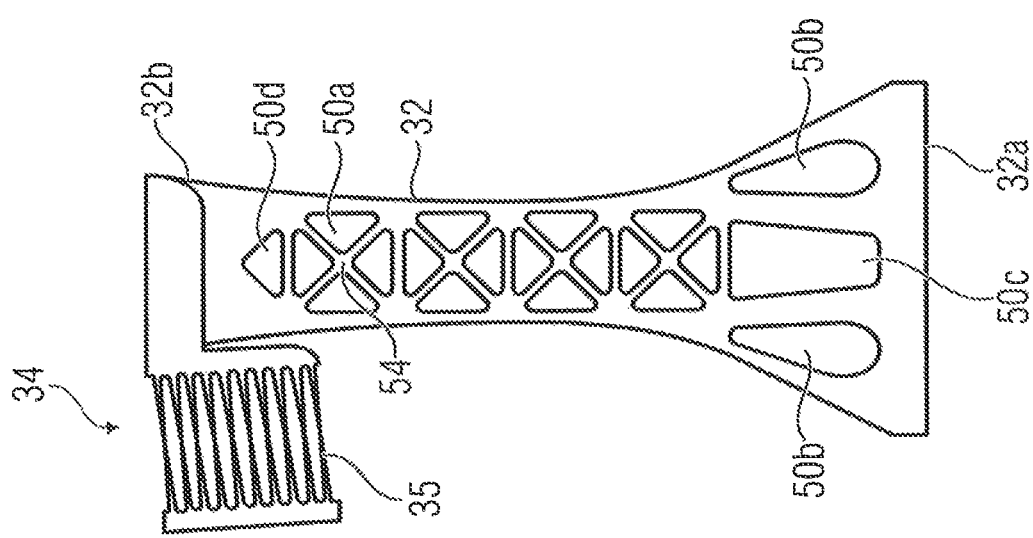

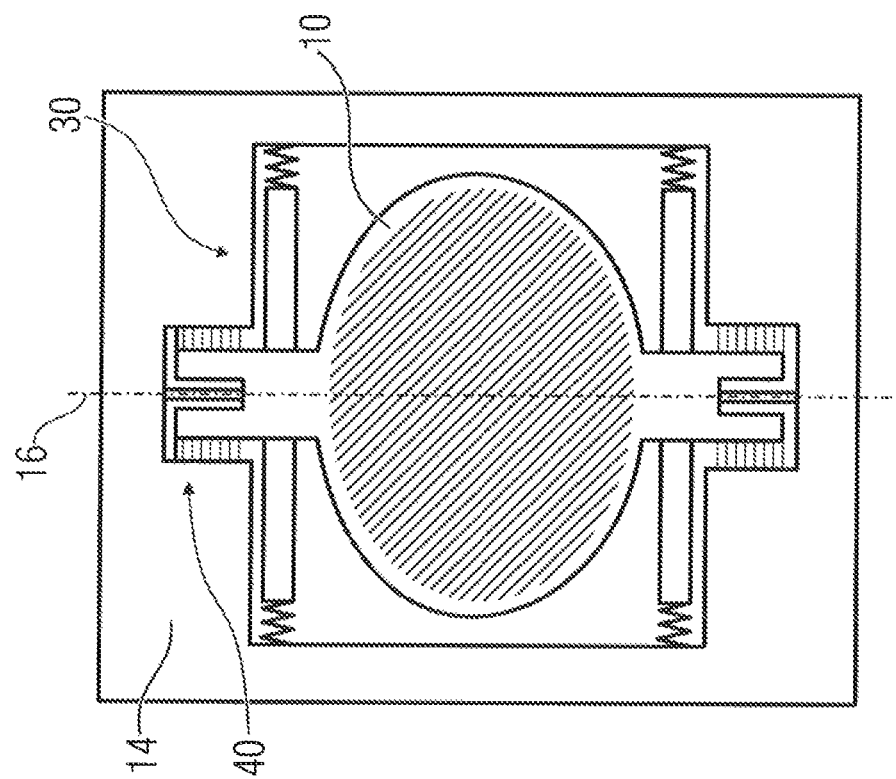
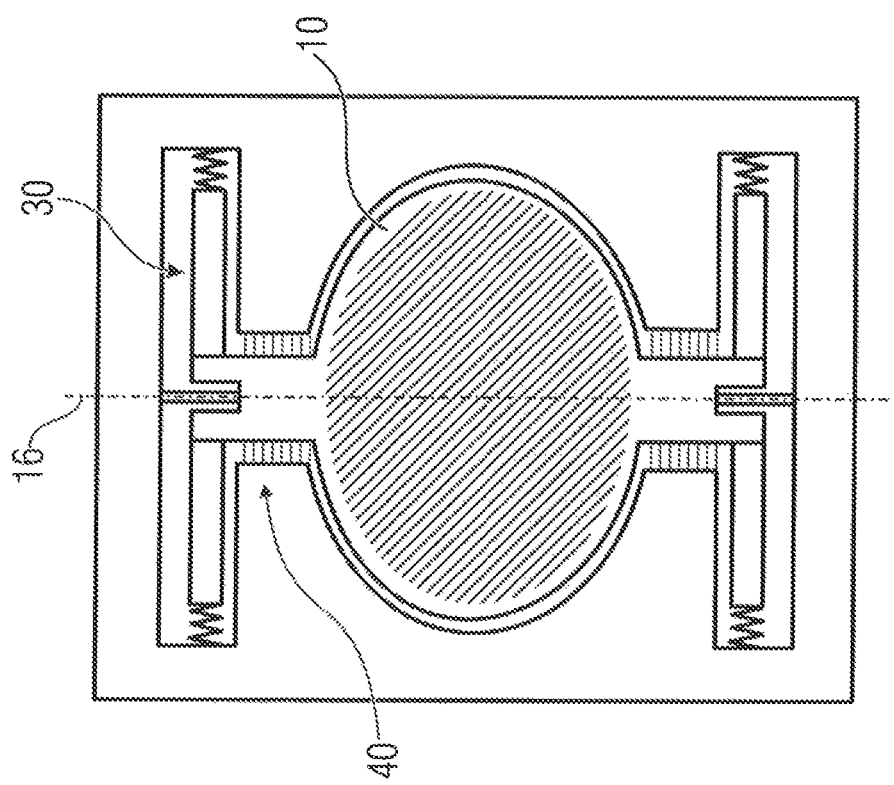

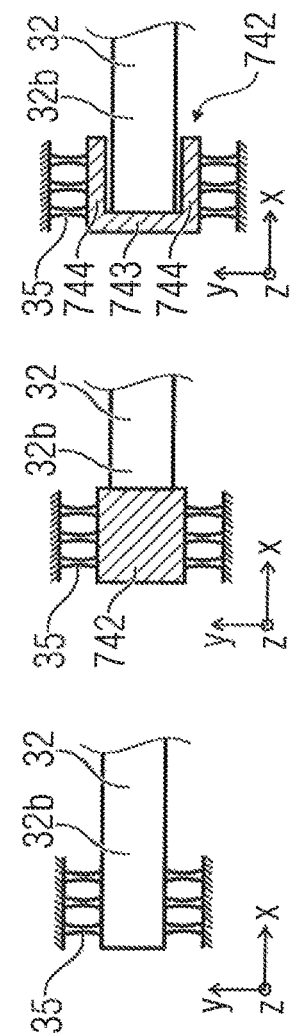
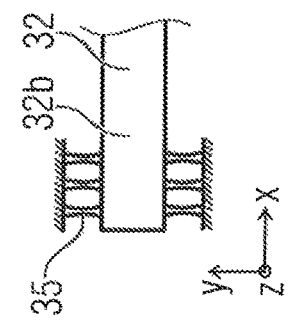
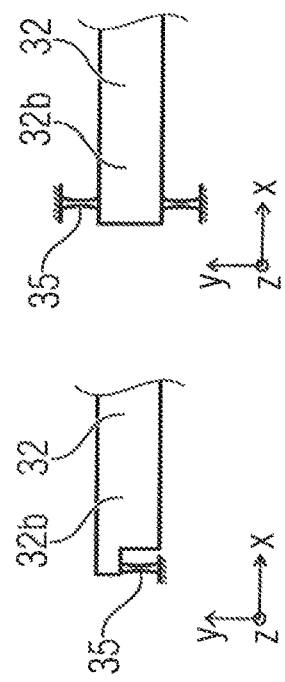
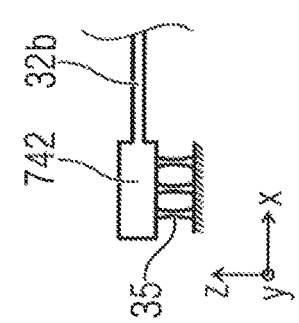
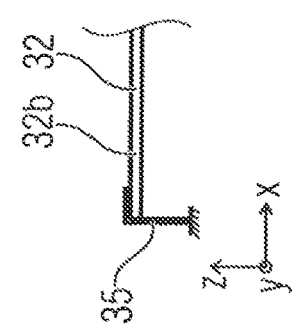
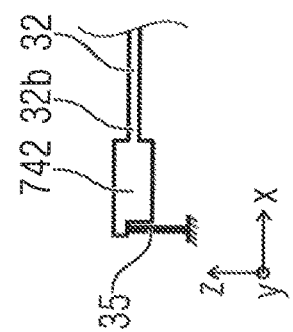
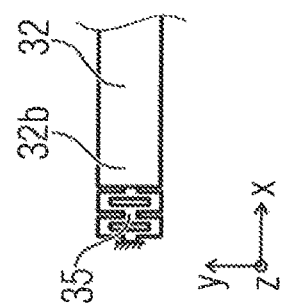
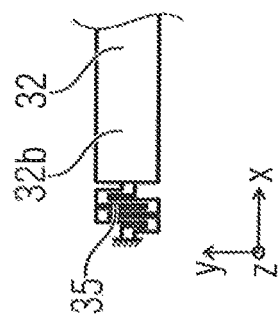

MIRROR DEVICE HAVING LEAF SPRING WITH OPENINGS

FIELD

The present disclosure relates to mirror devices such as Micro Electro Mechanical System (MEMS) scanning mirrors.

BACKGROUND

Micro Electro Mechanical System (MEMS) scanning mirrors are being used in different fields. MEMS scanning mirrors comprise a mirror rotatable about at least one rotation axis in order to reflect electromagnetic energy, such as visible or invisible light, into different directions. For example, MEMS scanning mirrors may be used in projecting two-dimensional images onto a screen. MEMS scanning mirrors may also be used in LIDAR applications.

LIDAR may be regarded as representing an abbreviation for Light Imaging, Detection, And Ranging or as an artificial word composed of the terms light and radar. Generally, LIDAR may be regarded as a surveying method that measures distance to a target by illuminating that target with a pulsed laser light and measuring the reflected pulses with a sensor.

MEMS scanning mirrors may be used for LIDAR in automotive applications. Generally, MEMS scanning mirrors for LIDAR applications may comprise relatively large dimensions and large scan angles for a high optical performance. For example, such MEMS scanning mirrors may have an ex-tension of 2 to 4 µm in each of two perpendicular directions spanning a mirror plane. In addition, such MEMS scanning mirrors should have a high robustness, i.e., should be in-sensitive to vibrations and thermal loads, and should develop low mechanical stresses. It is challenging to find a design and manufacturing process that meets these goals.

In order to make a MEMS scanning mirror robust against vibrations, the mirror should have a low inertia, i.e., a light and stiff mirror body. In addition, the mirror should have a high stiffness of its suspension for all degrees-of-freedom (DOF) of the mirror body.

In order to achieve a light and stiff mirror body, the mirror body may comprise a relatively thin mirror and a thicker reinforcement structure for the mirror. The mirror body may be rotatable arranged in a mirror frame around a rotation axis extending in a plane defined by the mirror frame. The rotation axis may extend to first and second mutually opposite end-portions of the mirror body. The mirror may have a reflective plane on a first main surface and opposite the first main surface a second main surface provided with the reinforcement structure.

In order to achieve a high stiffness suspension, the mirror body may be supported in the mirror frame using support beams extending along the rotation axis and additional cantilever beam or leaf spring assemblies. The cantilever beam assembly may have a longitudinal direction and may extend within the plane defined by the frame. The support beams may be connected between the mirror body and the frame at two opposite ends of the mirror body along the rotation axis. The cantilever beam assembly may have a cantilever beam coupled at a first end via a relief structure to the mirror frame and fixed at a second end to the mirror body. The cantilever beam may have a thickness, perpendicular to a plane of the frame, that is smaller than its width in the plane of the frame.

Results of the low inertia and the high suspension stiffness of the mirror body may be high resonance frequencies a good dynamic performance. These properties may also make the device which is operated at the resonance frequency around the main axis of rotation very fast. In normal operation, i.e. at resonance, accelerations at the mirror tips of typically 10000 G may be achieved. This may make any external vibration negligible.

In some applications, mirrors having a lower resonance frequency may be desirable. A light mirror body and a high stiffness of suspension may make it difficult to design a mirror that is operated at a lower resonance frequency. For example, in LIDAR applications, a lower resonance frequency may be desirable because more laser pulses can then be fired in a single scan for achieving a certain dwell time when coded pulse trains are used. Lower resonance frequencies may be desirable because the mechanical stresses are reduced.

SUMMARY

Examples of the present disclosure provide a mirror device including a frame, a mirror body arranged in the frame and rotatable around a rotation axis, support beams connected between the mirror body and the frame, and at least one leaf spring providing torsional stiffness with respect to a rotation of the mirror body around the rotational axis. The leaf spring has a maximum thickness that is smaller than a minimum width thereof wherein the leaf spring has openings reducing the thickness thereof or penetrating the leaf spring in the thickness direction. The openings include openings which are completely surrounded by material of the leaf spring when viewed in the direction of the thickness of the leaf spring.

In examples, at least one of the openings has an extension in the direction of the width of the leaf spring less than the minimum width of the leaf spring.

Examples of the present disclosure provide a mirror device including a frame, a mirror body arranged in the frame and rotatable around a rotation axis extending in a plane defined by the frame, support beams connected between the mirror body and the frame along the rotation axis, and at least one leaf spring providing torsional stiffness with respect to a rotation of the mirror body around the rotational axis. The at least one leaf spring includes a leaf spring having a first end and a second end and a longitudinal direction between the first end and the second end, the first end being coupled to the mirror body and the second end being coupled to the frame. The leaf spring has a maximum thickness, perpendicular to the plane, that is smaller than a minimum width of the leaf spring, in the plane, and the leaf spring has openings reducing the thickness thereof or penetrating the leaf spring in the thickness direction.

In examples, the openings include openings having in the longitudinal direction of the leaf spring a larger extension than in the width direction thereof.

BRIEF DESCRIPTION OF THE DRAWINGS

Examples of the disclosure will be described using the accompanying drawings, in which:

FIGS. 8A and 8B show schematic cross-sectional views of examples of leaf springs;

FIGS. 9A to 9C show schematic views of leaf springs according to examples of the present disclosure;

FIGS. 15A to 15D show schematic illustrations of mirror devices having actuators at different locations;

FIGS. 17A to 17J show schematic illustrations of various examples of relief links, each with a different number of relief springs, with a different location of the relief springs, or with a different connection to the leaf spring.

DETAILED DESCRIPTION

In the following, examples of the present disclosure will be described in detail using the accompanying drawings. It is to be pointed out that the same elements or elements having the same functionality are provided with the same or similar reference numbers and that a repeated description of elements provided with the same or similar reference numbers is typically omitted. Hence, descriptions provided for elements having the same or similar reference numbers are mutually exchangeable. In the following description, a plurality of details is set forth to provide a more thorough explanation of examples of the disclosure. However, it will be apparent to one skilled in the art that other examples may be practiced without these specific details. In other instances, well-known structures and devices are shown in block diagram form rather in detail in order to avoid obscuring examples of the present disclosure. In addition, features of the different examples of the present disclosure may be combined with each other, unless specifically noted otherwise.

In examples, the mirror body is rotatable around a rotation axis extending in a plane defined by the frame in which the mirror body is arranged. In other examples, the rotation axis may extend above or below a plane defined by the frame. In examples, the support beams are connected between the mirror body and the frame along the rotation axis. In other examples, one or more support beams may extend in an angle relative to the rotation axis. In examples, the thickness direction of the leaf spring is perpendicular to the plane defined by the frame. In examples, the width direction is in the plane defined by the frame. In examples, the thickness direction of the leaf spring is normal to a plane defined by a mirror surface of a mirror of the mirror body at rest. In examples, the width direction is parallel to the plane defined by the mirror surface of the mirror at rest.

Examples comprise at least one leaf spring assembly comprising the at least one leaf spring and a relief link, wherein the at least one leaf spring has a first end and a second end and a longitudinal direction between the first end and the second end, wherein a) the first end is fixed to the mirror body and the second end is coupled to the frame by the relief link or b) the first end is coupled to the mirror body by the relief link and the second end is fixed to the frame, wherein the relief link allows for a translation of the leaf spring in the longitudinal direction at its end adjacent to the relief link. In other examples, the first end of the at least one leaf spring may be coupled to the mirror body by a relief link and the second end of the at least one leaf spring may be coupled to the frame by relief link. In other examples, the first end of the leaf spring may be fixed to the mirror body and the second end of the leaf spring may be fixed to the frame.

Figure 4:
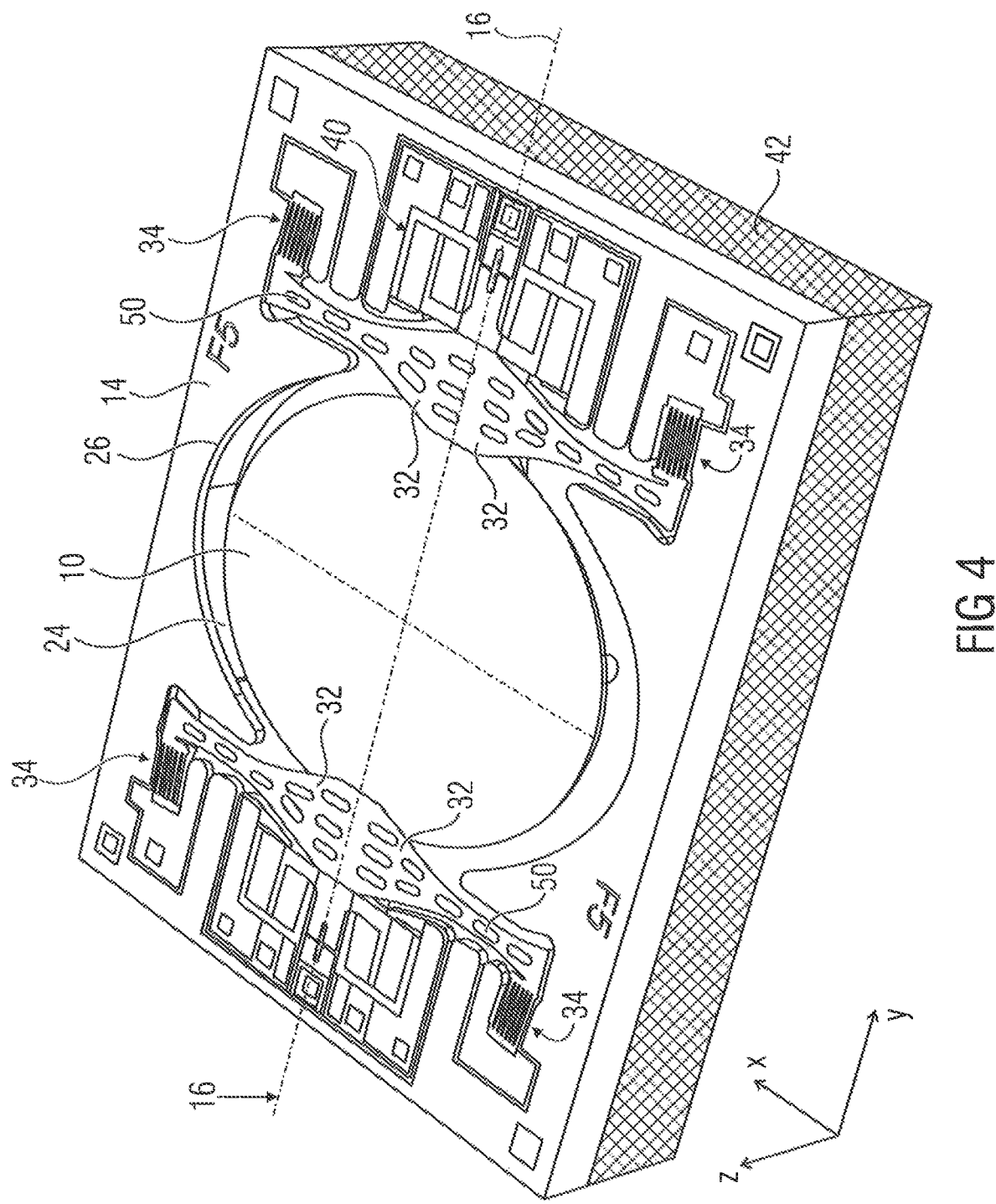
FIG. 4 shows a schematic three-dimensional view of the mirror device of FIG. 1 including a base layer.
Figure 5:
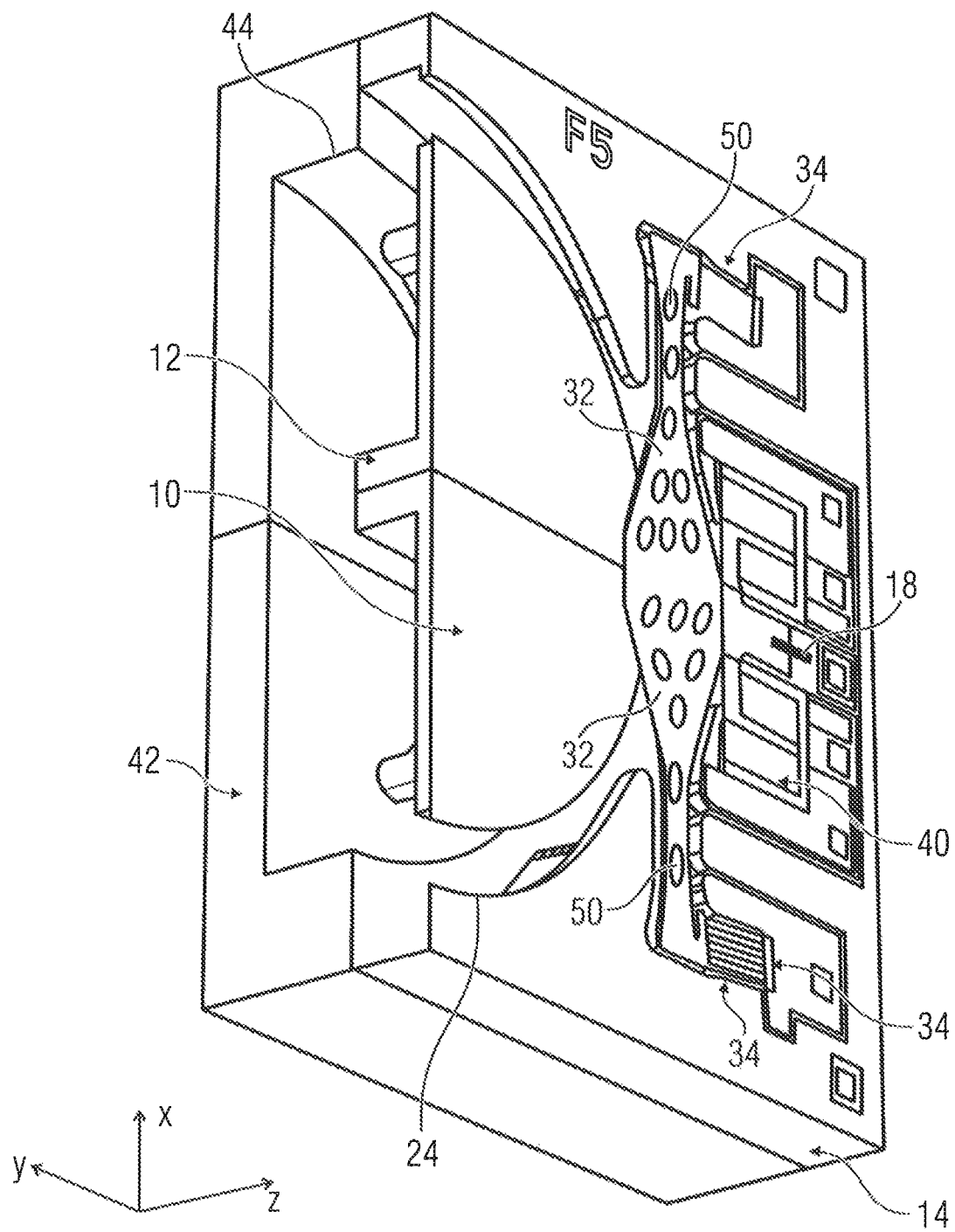
FIG. 5 shows a schematic three-dimensional cut-away view of the mirror device of FIG. 1.
Figure 6:
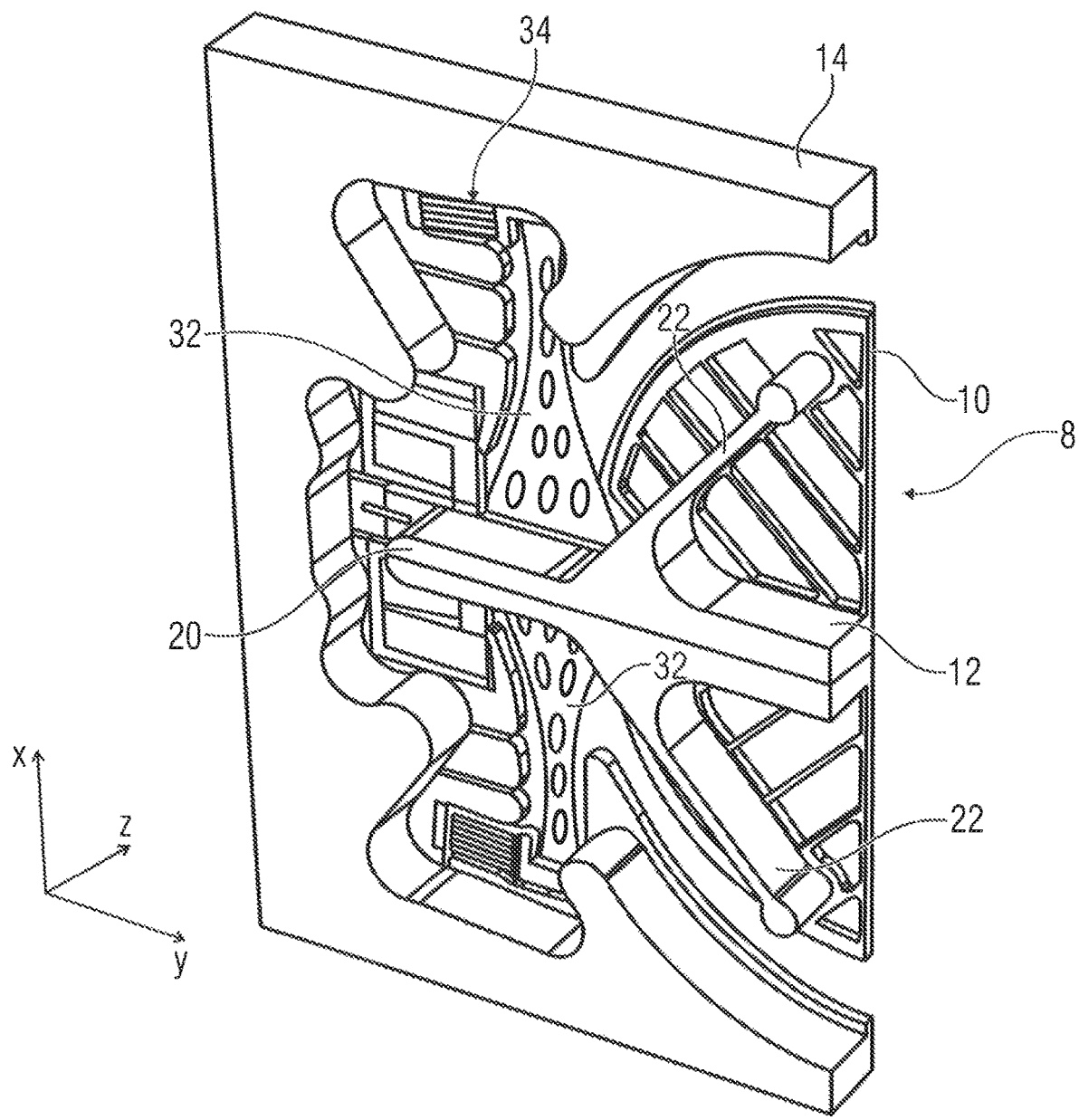
FIG. 6 shows a three-dimensional cut-away view of the mirror device of FIG. 1 from below.
Figure 7:
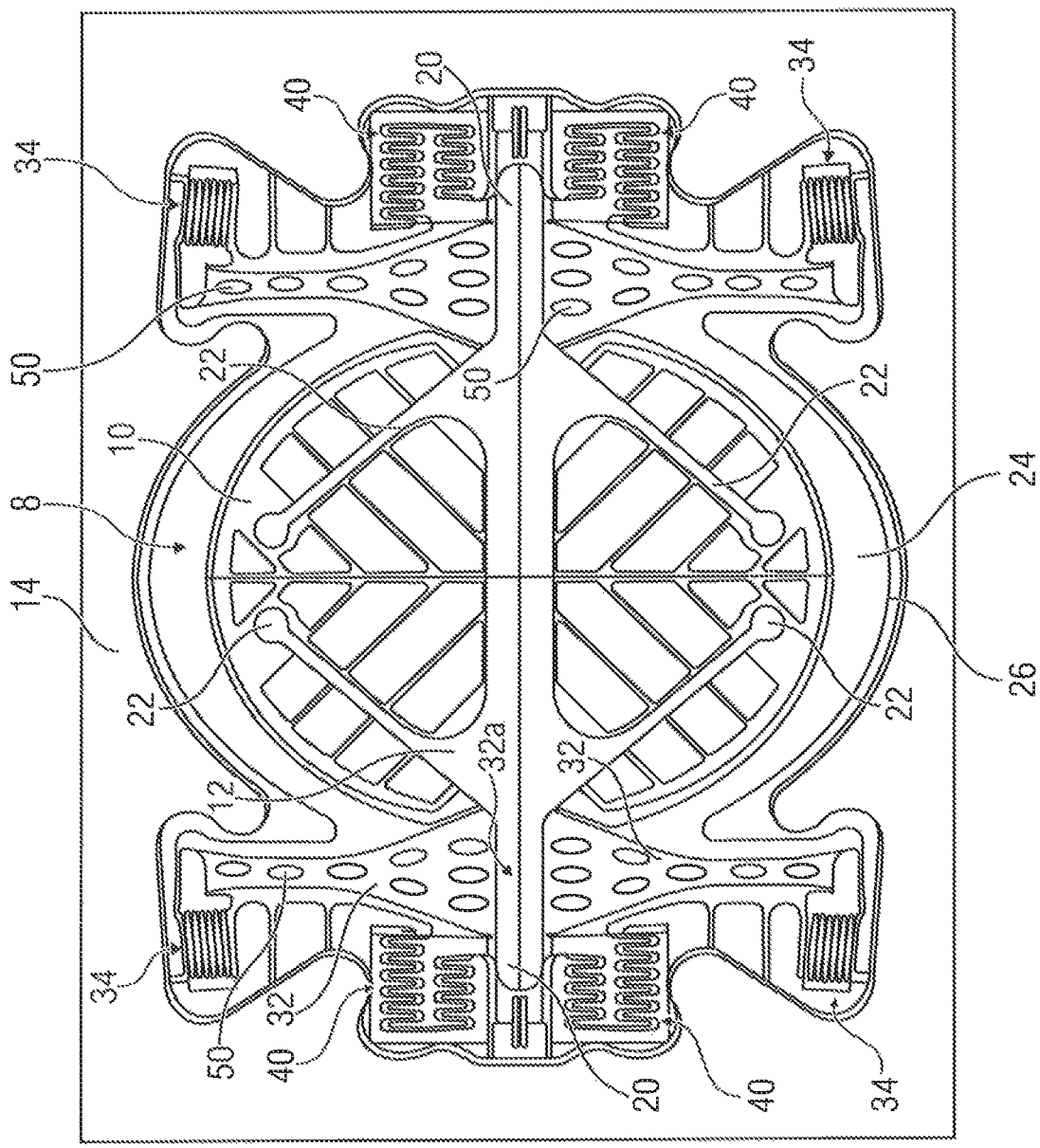
FIG. 7 shows a bottom view of the mirror device of FIG. 3.

Referring to FIGS. 1 to 6, an example of a mirror device, such as a MEMS scanning micro mirror, is now explained. The mirror device comprises a mirror body 8. The mirror body 8 comprises a mirror 10 and a mirror support 12, wherein the mirror support 12 is best shown in FIGS. 5 to 7. The mirror device further comprises a frame 14. The mirror body 8 is arranged in the frame 14. The frame defines a plane, i.e. the (x, y) plane in FIG. 1. The plane defined by the frame may be parallel to planes defined by main surfaces of a layer or a plurality of layers in which the frame is formed.

The mirror body 8 is rotatable around a rotation axis 16 extending in the plane defined by the frame. Support beams 18, which may also be referred to as torsion beams, are connected between the mirror body and the frame 14 along the rotation axis 16. To be more specific, a first support beam 18 is connected between a first end of the mirror body 8 and the frame 14 and a second support beam 18 is connected between a second end of the mirror body 8 and the frame 14, wherein the second end of the mirror body is opposite to the first end in the direction of the rotation axis 16. An enlarged view of one of the support beams 18 is shown in the enlarged portion C in the right hand side of FIG. 1. As can be seen, support beams 18 connect parts of mirror support 12 to parts of frame 14 and permit the mirror body to be rotated around rotation axis 16. The support beams 18 may be collinear with the rotation axis 16.

As can be best seen in FIGS. 5 to 6, mirror support 12 may include a longitudinal support bar 20 extending along the axis of rotation 16. The support bar 20 may protrude from the mirror 10 on both sides thereof in the direction of the rotation axis 16. Moreover, the mirror support 12 may include reinforcement beams 22. A first pair of reinforcement beams 22 may extend from a first end-portion of the mirror in mutually opposite directions away from the rotation axis 16. A second pair of reinforcement beams 22 may extend from an opposite second end-portion of the mirror in mutually opposite directions away from the rotation axis 16. The reinforcement beams 22 of the first pair may extend towards respective ones of the second pair. Moreover, the mirror 10 may additionally be structured as recognizable in FIGS. 6 and 7 thereof, in order to further reduce the mass of the mirror 10. For example, recesses may be formed in the surface of the mirror 10, which is opposite to a mirror surface thereof.

The mirror 10 may be formed on the mirror support 12. In another example, the mirror 10 may be attached to the mirror support 12. The face of the mirror 10 opposite to mirror support 12 defines a mirror plane of the mirror 10. Those skilled in the art will appreciate that the shape of the mirror 10 and the mirror support 12 are independent and can be any shape desired for a particular application, e.g., a circle, ellipse, square, rectangle or other shape as desired.

The mirror frame 14 defines a mirror recess 24 in which the mirror body 8 is arranged. The mirror recess 24 is defined by a recess periphery 26 of the mirror frame 14. The mirror frame may also be structured to define further recesses in which other components may be arranged, such as actuators and leaf spring assemblies.

The mirror device may comprise at least one leaf spring assembly 30. In the example shown, the mirror device comprises two pairs of leaf spring assemblies 30, wherein the leaf spring assembly in each pair extends from the mirror body 8 in opposite directions. In the example shown, the leaf spring assemblies 30 are arranged symmetrically with respect to the axis of rotation 16.

The at least one leaf spring assembly 30 includes a leaf spring 32 and a relief link 34. The relief link 34 may have one or more relief springs 35. The leaf spring 32 comprises a first end 32*a* and a second end 32*b*, see FIG. 1. The first end 32*a* is coupled to the mirror body and the second end is coupled to the frame 14. The leaf spring 32 has a longitudinal direction or extension between the first end 32*a* and the second end 32*b*. In the example shown in FIGS. 1 to 7, the first end 32*a* is fixed to the mirror support 12 and the second end 32*b* is coupled to frame 14 via the relief link 34. In examples, the first ends of two leaf springs 32 extending form the same portion of the mirror body 8 in different directions may be connected to each other.

As best shown in FIG. 7, the first end 32*a* of leaf spring 32 is fixed to support bar 20. In examples, the first end 32*a* is fixed to support bar 20 at a location outside of the mirror 10 in a plane view onto the plane defined by frame 14. In examples, the shape of the mirror may comprise concave portions in the region of the axis of rotation 16, wherein portions of the leaf springs 32 extend into the concave portions of the mirror 10. In examples, leaf springs 32 and mirror 10 may be formed in a same layer of material and may be connected to each other adjacent the axis of rotation 16.

In examples, the leaf springs may be implemented in a single crystal silicon layer having a direction of lower material stiffness, wherein the leaf springs have their longitudinal direction aligned with the direction of lower material stiffness. In examples, the leaf springs may be implemented in a silicon layer having a <100> axis and the leaf springs have their longitudinal direction aligned with the <100> direction which in this case has the lower material stiffness.

Torsional stiffness about the rotation axis 16 may be set using the leaf spring asemblies 30. The pair of support beams 18 supports the mirror body vertically, i.e. perpendicular to a main surface of the frame 14, at the rotation axis 16. However, the vertical support beams 16 may have a negligible effect on the torsional stiffness, so that the natural frequency of the mirror body may be substantially determined by the leaf spring assemblies 30. The natural frequency may be substantially independent of the support beams 18. The natural frequency as defined herein is the undamped frequency of the mirror body about its rotation axis 16. The support beams 18 may define the out-of plane rocking and vertical mode stiffness for the corresponding dynamic modes and corresponding resonance frequencies. The torsional stiffness can be decoupled from the out-of plane rocking and vertical mode stiffness so that the out-of plane rocking and vertical mode frequencies can be set to desired values, such as higher values, without influencing the torsional mode stiffness and resonance frequency. As defined herein, the Y axis is along the rotation axis 16, the X axis is perpendicular to the Y axis on the mirror plane when the mirror 10 is at rest, and the Z axis is perpendicular to and out of the mirror plane when the mirror 10 is at rest. The X, Y, and Z axis are axes of a tree dimensional Cartesian coordinate system.

Figure 1:
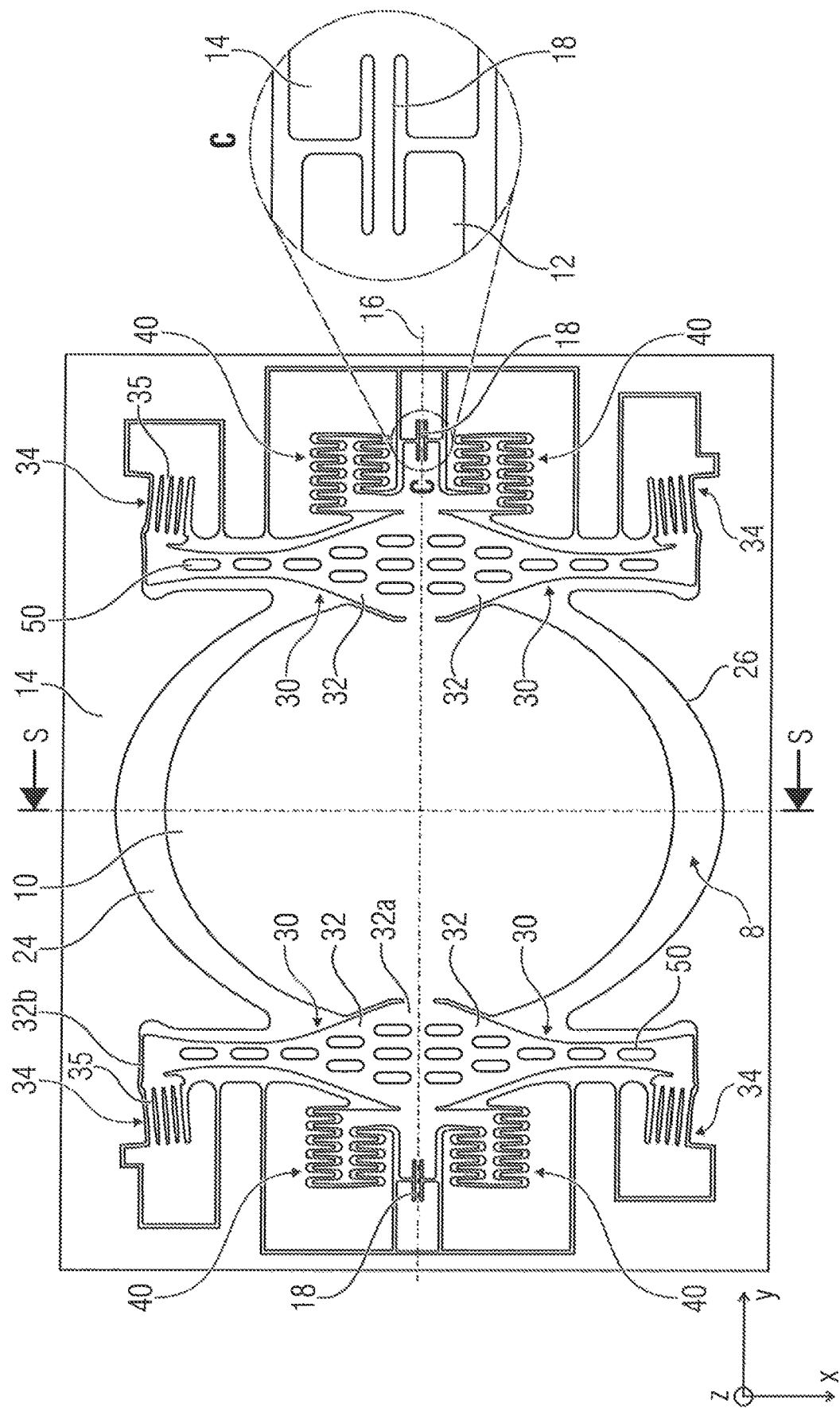
FIG. 1 shows a schematic top view of an example of a mirror device.
Figure 2A:
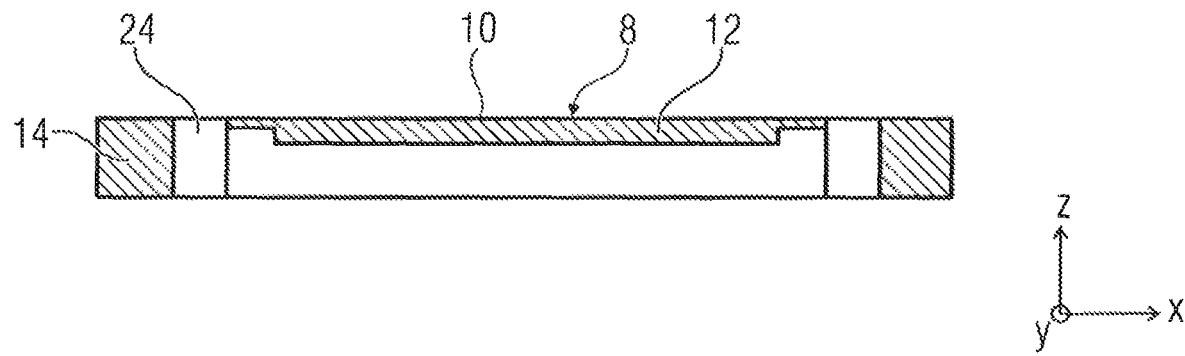
FIGS. 2A and 2B show schematic cross-sectional views along line s-s in FIG. 1 for explaining deflection of a mirror body.
Figure 2B:
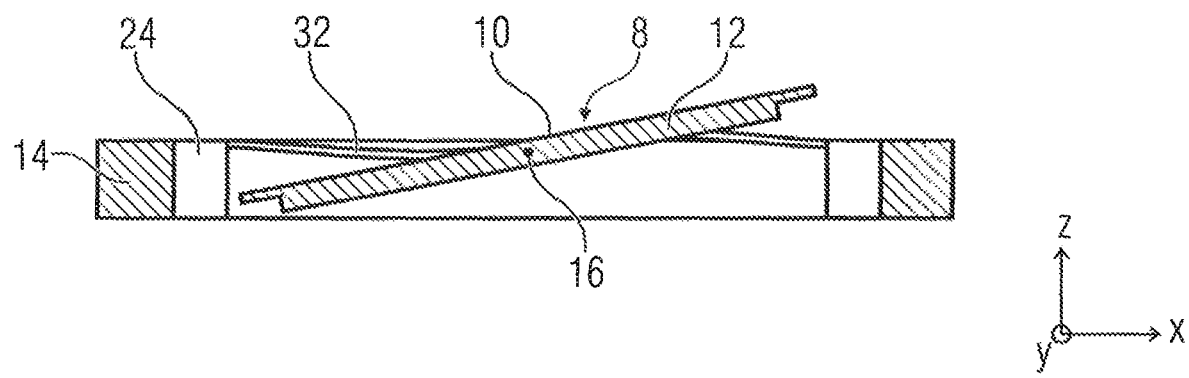
Figure 3:
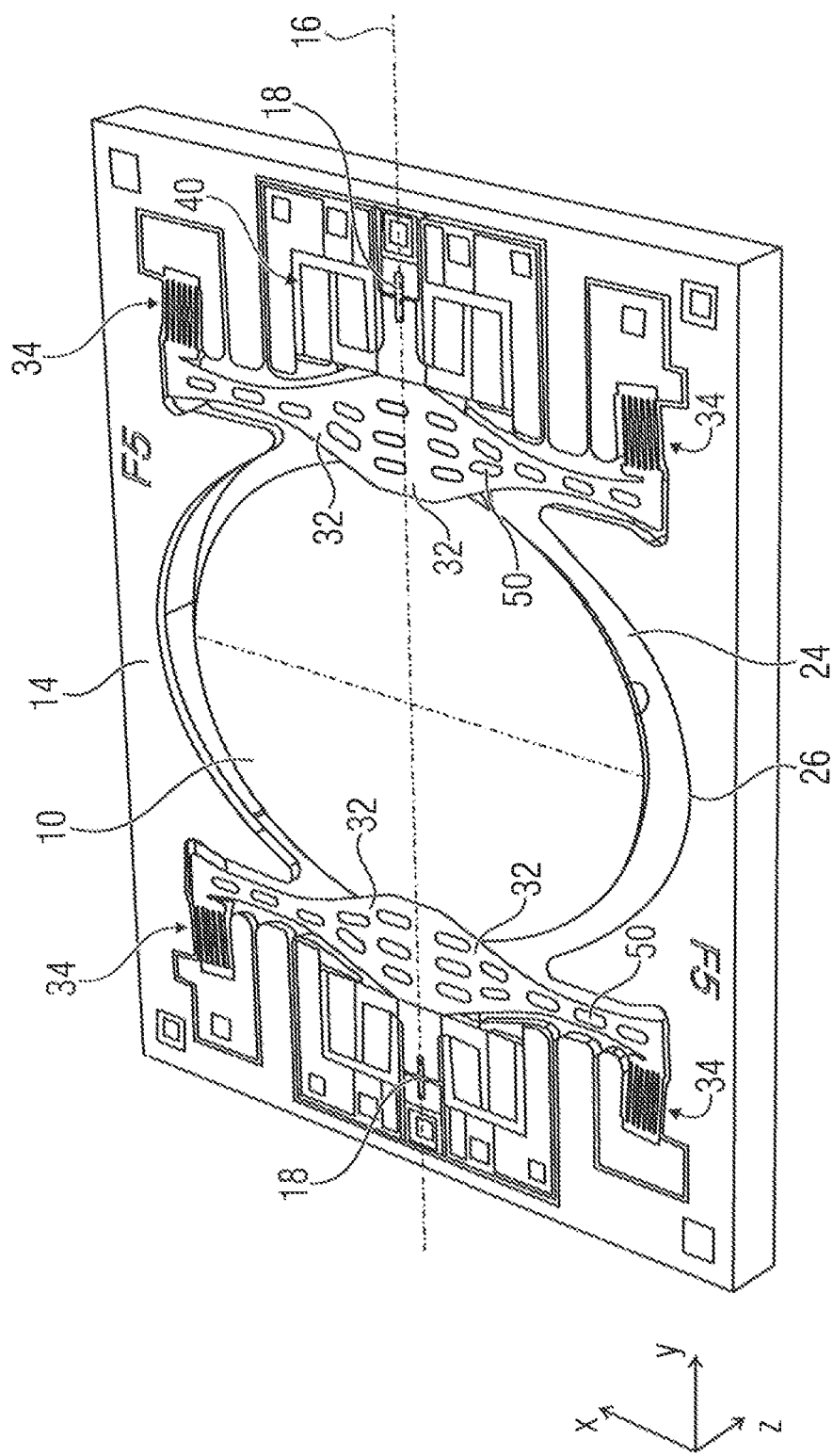
FIG. 3 shows a schematic three-dimensional view of the mirror device of FIG. 1.

FIG. 2A shows the mirror body 8 including the mirror 10 and the mirror support 12 in the rest position. FIG. 2B shows the mirror body 8 tilted about the rotation axis 16.

In the example shown in FIGS. 1 to 7, one end of the at least one leaf spring 32 is connected to the mirror body 8 at a location close to the rotation axis 16. The other end 32*b* is connected to the associated relief link 34 at a location further away from the rotation axis 16. The leaf spring assemblies 30 may provide torsional stiffness to the mirror body 8 about the rotation axis 16. The relief links 34 may provide a compliant or flexible coupling from the leaf springs 32 to the frame 14. The relief links may have a relatively low stiffness longitudinal to the leaf springs 32, i.e. in X direction in FIG. 1, which allows one end of the leaf springs 32 to move in their longitudinal direction when the mirror body 8 rotates around the rotation axis 16. The relief links 34 may have a relatively high stiffness in the trans-verse direction, i.e. in Z direction and in Y direction in FIG. 1.

The resonance frequency for rotation of the mirror 10 around the rotation axis 16 may be defined mainly by the inertia of the mirror body 8 and the stiffness of the leaf spring assemblies 30, which may be defined by the bending stiffness of the leaf springs 32 and by the torsional and translational stiffness of the relief links 32. The bending stiffness of the leaf springs 32 may be defined by the length, width, and, in particular, the thickness of the leaf springs 32. The combined stiffness in X direction of the support beams 18 and the relief links 74 may prevent movement of the mirror body 8 perpendicular to the rotation axis 16 (in the X direction) during operation. More detail on the relief links is provided below.

The support beams 18 are connected between the frame 14 and the mirror body 8 along the rotation axis 16 to support the mirror body 8 in the frame 14. In one example, the support beams 18 have narrow rectangular cross-sections perpendicular to the rotation axis 16, with the long axis of the rectangle perpendicular to the face of the mirror 10 and the mirror body 8, and the short axis of the rectangle parallel to the face of the mirror 10. The torsional stiffness corresponding to a rotation of the mirror body around rotation axis 16 may be provided by the leaf spring assemblies 30. The support beams 18 may serve only for support of the mirror body 8 and may have a negligible effect on the torsional stiffness. The support beams 18 may be sized so that the stiffness against vertical displacement (in Z direction) of the mirror body 8 and against its out-of-plane translation perpendicular to the rotation axis 16 (the X axis) may be as high as possible.

The mirror device may also include at least one actuator 40 to provide torque to drive the mirror body 8 about the rotation axis 16. In one example, the actuator may include mirror combs attached to the mirror body 8 interleaved with frame combs attached to the frame 14. Applying a difference in electrical potential between an interleaved mirror comb and frame comb may create a driving force between the mirror combs and the frame combs, which may create a torque on the mirror body 8 about the rotation axis 16. An oscillating electrical potential can be applied to drive the mirror device at its natural frequency. In other examples, actuation methods may include electromagnetic actuation and piezoelectric actuators. In electromagnetic actuation, the micro mirror may be "immersed" in a magnetic field and an alternating electric current through conductive paths may create the oscillating torque around the rotation axis 16. Piezoelectric actuators may be integrated in the leaf springs or the leaf springs may be made of piezoelectric material to produce alternating beam bending forces in response to an electrical signal and generate the oscillation torque.

Examples of the present disclosure relate to mirror devices manufactured using photolithography and Deep Reactive Ion Etch (DRIE) techniques. Examples of the mirror device may be formed in a plurality of stacked and structured material layers.

Examples of the mirror device may include an additional support layer 42 as shown in FIGS. 4 and 5. The additional support layer 42 may include a cavity 44 to permit rotation of the mirror 10 about the rotation axis 16. Accordingly, additional support layer 42 may be referred to as a cavity wafer of the mirror device.

Examples of the present disclosure relate to mirror devices, such as MEMS scanning micro mirrors, which are suitable to be operated at lower resonance frequencies. Generally, a few options could be considered to make a MEMS mirror slower. The inertia of the mirror body could be increased, but this would reduce the frequency of all eigenmodes, not only that of the main mode at which the MEMS mirror is operated. This would increase the sensitivity for external vibrations. To reduce the resonance frequency, the stiffness of the leaf springs could be reduced. Generally, the leaf springs, sometimes referred to as cantilever beams, can be made thinner but this would make manufacturing more difficult and would reduce the resonance frequency of the internal degrees-of-freedom of the leaf spring. The leaf springs could be made longer, but this would increase the chip size and, therefore, the cost. The leaf springs could be made more narrow, but this would strongly reduce the stiffness around the Z axis, i.e. the optical axis normal to the mirror surface. Thus, the frequency of the corresponding eigenmode would be reduced and the comb drives would be made more sensitive to pull-in.

According to examples of the present disclosure, the stiffness of the leaf springs is reduced by creating holes or openings in them. The goal of the holes or openings is to reduce the stiffness in one direction while keeping it in the other direction, rather than to re-duce weight or material cost. This reduces the natural resonance frequency (main resonance frequency) without strongly affecting the frequency of the other eigenmodes, and hence without affecting the robustness. Specifically, the stiffness against the rotation around the Z axis, which is mainly determined by bending of the leaf springs in the XY plane and therefore by the width of the leaf springs, may still be very high. This would not be possible by simply reducing the width of the leaf springs.

Thus, according to examples of the present disclosure, at least one of the leaf springs 32 includes openings 50 as schematically shown in FIGS. 1 to 7. It is to be noted that only some of the openings are provided with a reference sign 50 in order not to over-burden the Figures.

FIGS. 8A and 8B show cross-sectional views (along the longitudinal direction thereof) of examples of leaf springs 32. The thickness of the leaf spring 32 in the Z direction, i.e. perpendicular to the plane defined by the frame, is smaller than its width in the plane de-fined by the frame. It is to be noted that the plane defined by the frame may be coincident with the mirror plane, defined by the mirror 10 when the mirror 10 is in its rest position. In either case, the plane defined by the frame may be parallel to the mirror plane if the mirror is in its rest position. In the example shown in FIG. 8A, the openings 50 penetrate the leaf spring 32 in the thickness direction, i.e. in the Z direction. In the example shown in FIG. 8B, openings 52 do not penetrate the leaf spring in the thickness direction but reduce the thickness thereof in certain areas. Thus, in examples the leaf spring may have regions where it has a specific thickness and other regions where the thickness is reduced by the openings not completely penetrating the leaf spring.

In examples, the openings are arranged to reduce, when compared to a leaf spring not including the openings, the torsional stiffness with respect to a rotation of the mirror body around the rotation axis more than the rotational stiffness with respect to rotations around axes perpendicular to the rotational axis, specifically around the Z-axis. In this regard, it is to be noted that the openings shown in FIGS. 1 and 3 to 7 are merely illustrative.

In examples, the openings may comprise three or more openings, five or more openings, or ten or more openings. In examples, a first end of the leaf spring is coupled to the mirror body and a second end of the leaf spring is coupled to the frame, wherein the openings comprise an opening arranged closer to the first end than to the second end. In examples, the openings comprise an opening arranged closer to the second end than to the first end. In examples, the openings are distributed over a region covering 50% or more of the area of the leaf spring when viewed in the direction of the thickness of the leaf spring. In examples, the openings comprise at least two openings of different shapes and/or different areas when viewed in the direction of the thickness of the leaf spring. In example, the openings occupy a percentage of the area of the leaf spring when viewed in the direction of the thickness of the leaf spring in a range of 20% to 90%.

In examples, the openings may be arranged to provide a truss structure of the leaf spring in a plan view onto the leaf spring, i.e. onto the plane defined by the mirror frame 14. In examples, the openings may comprise openings arranged with a cross-shaped, y-shaped or x-shaped land between them. In examples, the openings may comprise triangular openings in a plan view. In examples, the openings may comprise longitudinal rectangular openings extending in the longitudinal direction of the leaf spring. In examples, the leaf springs may have regions of different widths, wherein the openings may comprise pairs of longitudinal rectangular openings formed side by side in the width direction in a portion of the leaf spring having a smaller width than other portions thereof. In examples, in a plan view, fillets may be formed in the corners of the openings and the openings do not include acute corners.

In examples, the at least one leaf spring has a width that increases towards the end thereof, which its fixed to either the mirror body or the mirror frame. In examples, the width of the at least one leaf spring also increases from a middle portion towards the end thereof, which is coupled to the mirror frame or the mirror via the relief link. The width at the end which is fixed to the respective counterpart may be wider than the width of the leaf spring at the end which is coupled to the respective counterpart via the relief link. In examples, the leaf spring is tapered having a wide base and a narrow neck. Reference is made to the examples of the leaf spring shown in FIGS. 1 and 3 to 7, for example.

In examples, the openings in the leaf spring may comprise triangular-shaped holes, with fillets in the three corners of the triangular-shaped holes. The structure of the at least one leaf spring may be based on the robust truss structure for towers, using triangular holes to provide truss bars between them for a robust static structure, in particular at the region closer to the maximum torque of rotation. In examples, the end of the leaf spring, which is fixed to the respective counterpart (i.e. the mirror body or the mirror frame) does not include recessed portions or openings. In other words, the portion of the leaf spring fixed to the respective counterparts is continuous so that a stable connection is achieved. In examples, all corners of the openings in a plane view may be turned to curves to avoid stress concentration at acute corners.

FIGS. 9A, 9B and 9C show top views of examples of leaf spring assemblies 30 comprising the leaf spring 32 and the relief link. As shown in FIGS. 9A to 9C, each relief link 34 may include a number of relief springs 35, which are arranged in parallel to each other. The leaf springs 32 are tapered towards a middle part thereof, wherein the width at the first end 32*a* is larger than the width at the second end 32*b*. The first end 32*a* may be fixed to the mirror frame.

FIGS. 9A to 9C show different configurations (patterns) of openings. The different configurations have been simulated for the optimum result. To be able to reach a low frequency, the introduced opening patterns on the at least one leaf spring should satisfy a desired stress value limit which may be given by a design library. In addition, the effects of higher order eigenmodes, especially rotation around the Z axis, may be controlled to se-cure the dynamic operation of the mirror device, to be able to reach a lower resonance frequency.

The designs shown in FIGS. 9A to 9C resemble an Eiffel Tower and, therefore, the opening patterns may be referred to as providing an Eiffel Tower structure.

The design shown in FIG. 9A includes respective groups of four triangle-shaped openings 50*a*. The triangle-shaped openings 50*a* may be arranged with respective tips oriented towards each other so that a cross- or x-shaped land 54 is formed between them. These groups of triangular openings 50*a* may be formed in portions of reduced width of the leaf spring 32*a*. In the example shown in FIG. 9A, two additional triangular shaped openings 50*b* and a trapezoid opening 50*c* arranged between them are provided in the wider portion of the leaf spring 32*a*. An additional triangular opening 50*d* may be provided adjacent the second end 32*b* of leaf spring 32*a*. The leaf spring shown in FIG. 9A may have a satisfying stability and a sufficient dynamic behavior. Other designs may permit narrower leaf springs. Moreover, different designs may be suitable for different frequency ranges.

FIG. 9B shows an opening pattern comprising pairs of elongate openings 50*e* in a narrower portion of the leaf spring and triangular openings in the widening portion thereof. To be more specific, the triangular openings comprise a group of four triangular openings 50*f* having an x-shaped land there between and a group of three triangular openings 50*g* with a larger triangular opening arranged between two smaller triangular openings.

FIG. 9C shows a different pattern of openings also including pairs of elongate openings 50*e* in a narrower portion of the leaf spring. Triangular openings 50*h* with rounded corners are formed in the widening portion of the leaf spring. Some of the triangular openings are arranged such that a y-shaped land is formed between them.

Simulations showed that at least for some applications the design shown in FIG. 9C may show the best results including dynamical behavior. In such a design, the structures of the openings may be in the form of triangles with rounded corners at the region closer to the axis of rotation to reduce stress and slotted holes at the region with the lower stress.

It is to be noted that the leaf springs described with respect to the different examples herein may comprise openings as shown in FIGS. 9A to 9C. In other examples, the openings may include different shapes and different arrangements.

Figure 10A:
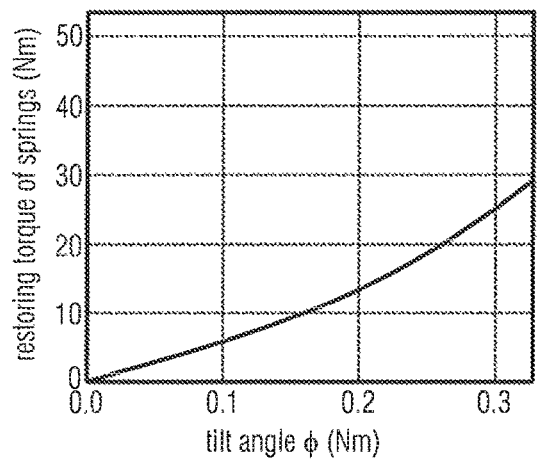
FIGS. 10A and 10B show diagrams of a tilt angle and a resonance frequency of a mirror device having leaf springs without openings.
Figure 11A:
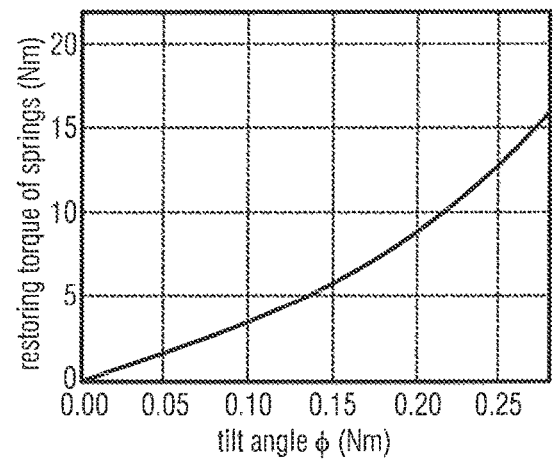
FIGS. 11A and 11B show diagrams of a tilt angle and a resonance frequency of a mirror device having leaf springs with openings.
Figure 10B:
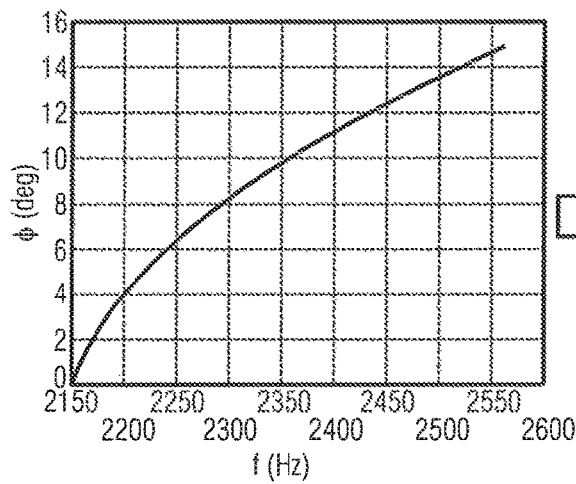
Figure 11B:
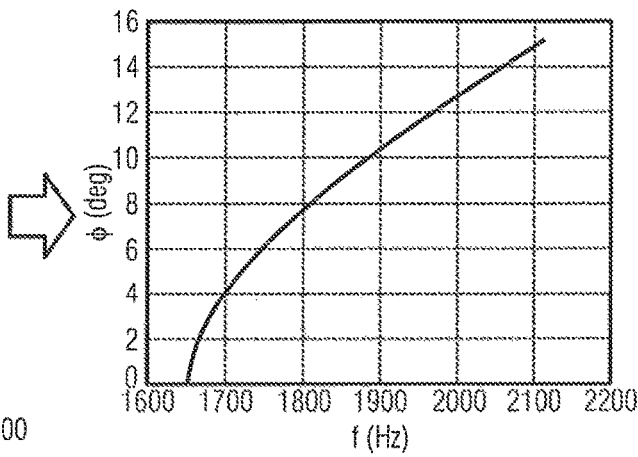

FIG. 10A shows the restoring torque of a mirror body versus the tilt angle thereof, for a mirror device comprising leaf springs having the shape shown in FIG. 9C but not including openings. FIG. 10B shows the tilt angle versus the resonance frequency for such a mirror body. FIGS. 11A and 11B show the respective curves for a mirror device comprising the leaf spring shown in FIG. 9C including the openings. A comparison of FIGS. 10A and 11A shows a torque drop with respect to the rotation angle. FIGS. 11A and 11B show the angle of rotation of the mirror device with respect to the frequency, which also show the non-linear frequency response curve. It can be derived that providing the leaf spring with openings may decrease the corresponding resonance frequency, such as by about 25%.

Accordingly, examples of the present disclosure allow for designing and manufacturing slower mirror devices, such as MEMS mirror devices, by reducing the stiffness of at least one leaf spring around the main rotation axis more than reducing the stiffness around the optical axis (Z axis). It would be desirable to not reduce the stiffness around the optical axis at all. In examples, in operation rotation around the Y axis takes place at resonance, i.e. there is one degree-of-freedom. In examples, higher modes in the other degrees-of-freedom should be suppressed. For example, rotation around the Z axis (RZ) should be suppressed as this could damage comb drives. This also applies, to lesser extent, for translations in the X direction (TX). Translations in the Z direction (TZ) should be controlled to suppress a so-called "speaker-mode". Rotations around the X-axis (RX) should be con-trolled in order to prevent "wobble" of the scan line. In addition, a mirror device should be robust against vibrations. Examples of the present disclosure permit achieving some or all of these goals.

Examples herein include four leaf springs. In other examples, another number of leaf springs may be provided. In examples, all leaf springs may be provided with openings. In other examples, some of the leaf springs of a mirror device may be provided with openings while other leaf springs of the mirror device are not provided with openings. Examples disclosed herein permit keeping the width of the leaf spring (in Y direction) to keep a high stiffness against rotation around the Z axis, wherein the bending stiffness (RY) is reduced by inserting holes. According to examples, a truss construction is used to reduce stiffness in one direction while keeping it in the other directions. In examples, a single mask change with respect to previous designs is to be performed in manufacturing a mirror device.

Examples of the present disclosure relate to a mirror device, in which the mirror oscillates in one dimension. Other examples may relate to mirror devices oscillating in two dimensions, such as mirrors used in two-dimensional laser scanners, and, thus relate to mirror devices allowing scanning in two dimensions using two orthogonal rotation axes. The present disclosure may be applied to such two-dimensional scanners by providing a bearing for the mirror frame, which is rotatable around a rotation axis perpendicular to the rotation axis 16, for example. Examples may relate to MEMS mirror devices having a natural resonance frequency of 1 to 3 kHz. Examples may relate to a mirror device having a mirror which has dimensions in the X direction and the Y direction (i.e. in the mirror plane) of 2 to 4 mm.

In the example shown in FIGS. 1 to 7, the first end 32*a* of the at least one leaf spring 32 is fixed to the mirror frame 14. The term "fixed" is used in the present disclosure in the usual meaning in that there is a rigid connection between the components which are fixed to each other. As it is shown in FIGS. 1 to 7, the first ends 32*a* of respective leaf springs 32 may be connected to each other. Nevertheless, the respective end 32*a* remains fixed to the mirror frame 14. In other examples, the mirror device may have a different construction.

Figure 12A:
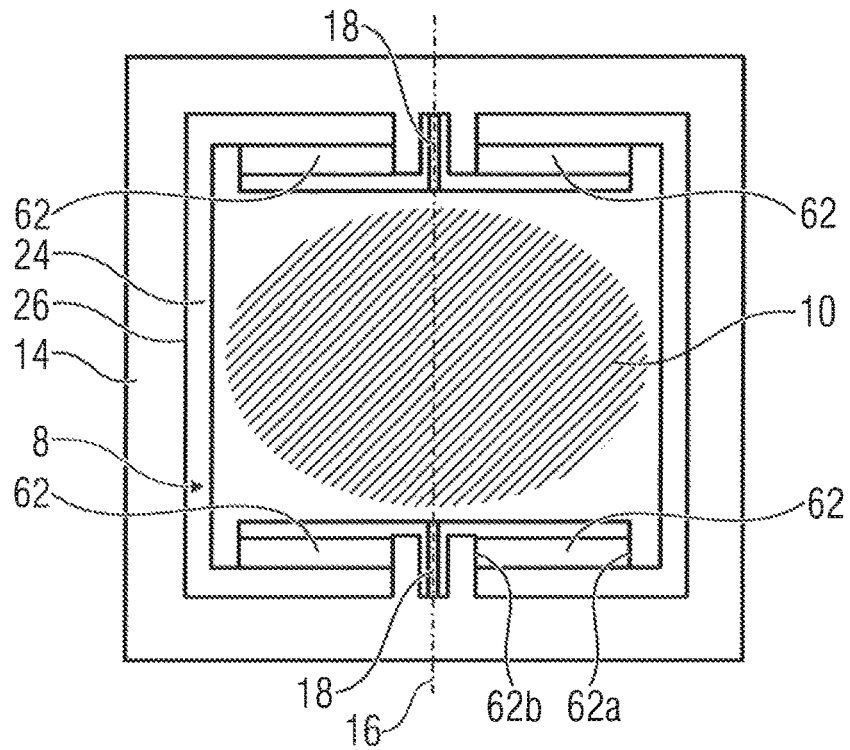
FIGS. 12A and 12B show schematic illustrations of examples of mirror devices, in which a second end of the leaf spring is fixed to a mirror frame.

FIG. 12A shows an example of a mirror device comprising at least one leaf spring 62. The leaf spring has a first end 62*a* and a second end 62*b*. The first end 62*a* is fixed to the mirror body 8 and the second end 62*b* is fixed to the frame 14. The second end 62*b* is fixed to the frame 14 at a position relatively close to the rotation axis 16 and the first end 62*a* is fixed to the mirror body 8 at a location relatively further away from the rotation axis 16. The leaf springs 62 may be configured according to the present disclosure, i.e. may be provided with openings. The openings may comprise openings having in the longitudinal direction of the leaf spring 62 a larger extension than in the width direction thereof.

Figure 12B:
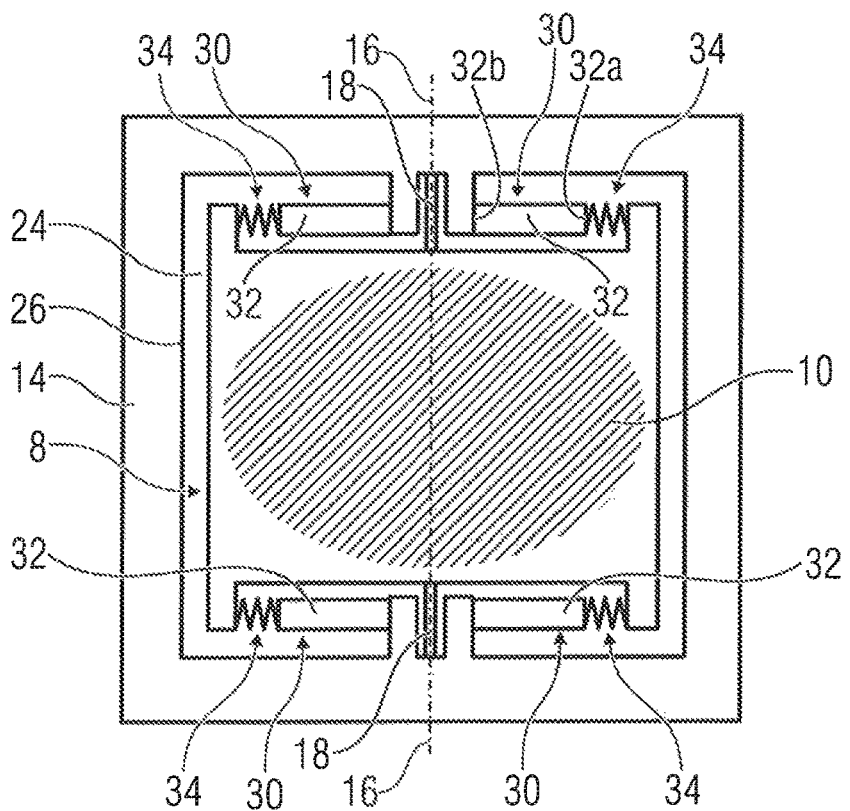

FIG. 12B shows an example, in which leaf spring assemblies 30 are connected between the mirror body 8 and the frame 14, wherein the first end 32*a* of the leaf spring 32 is connected to the mirror body 8 via the relief link 34 and the second end 32*b* of the leaf spring 32 is fixed to the frame 14.

Figure 13A:
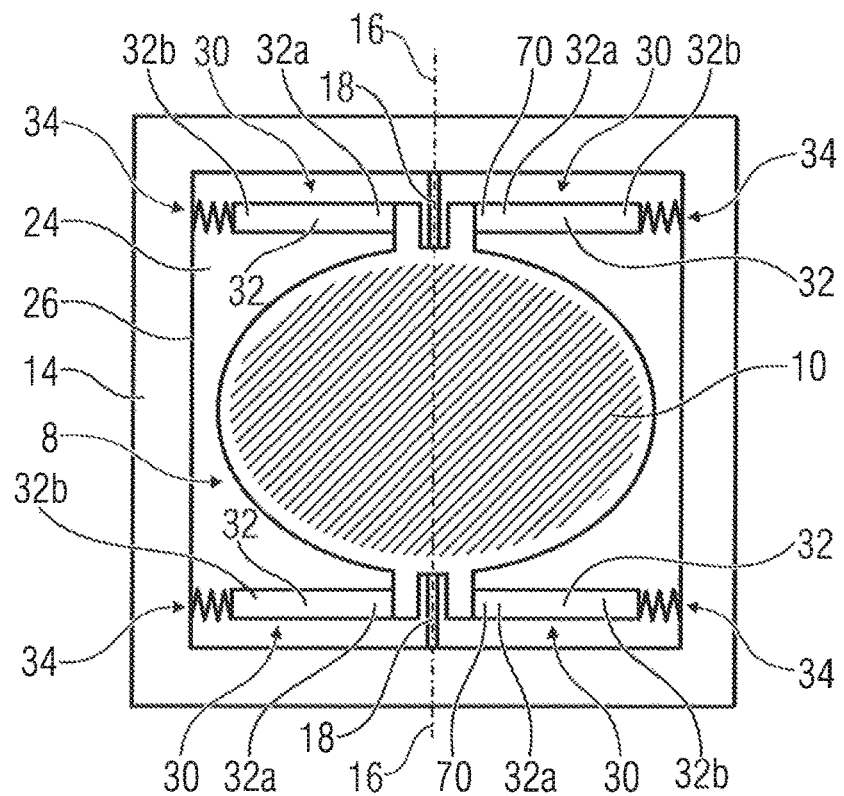
FIGS. 13A to 13C show schematic illustrations of examples of mirrors devices, in which the first end of the leaf spring is fixed to a mirror body.

FIG. 13A shows a schematic view of an example of a mirror device comprising at least one leaf spring assembly. The leaf spring assembly comprises the leaf spring 32 and the relief link 34. The first end 32*a* of the leaf spring 32 is fixed to the mirror body 8 at a location 70 relatively close to the rotation axis 16. The second end 32*b* of the leaf spring 32 is connected to its relief link 34 at a location further away from the rotation axis 16. The second end 32*b* of the leaf spring is connected to the frame 14 via the relief link 34.

Figure 13B:
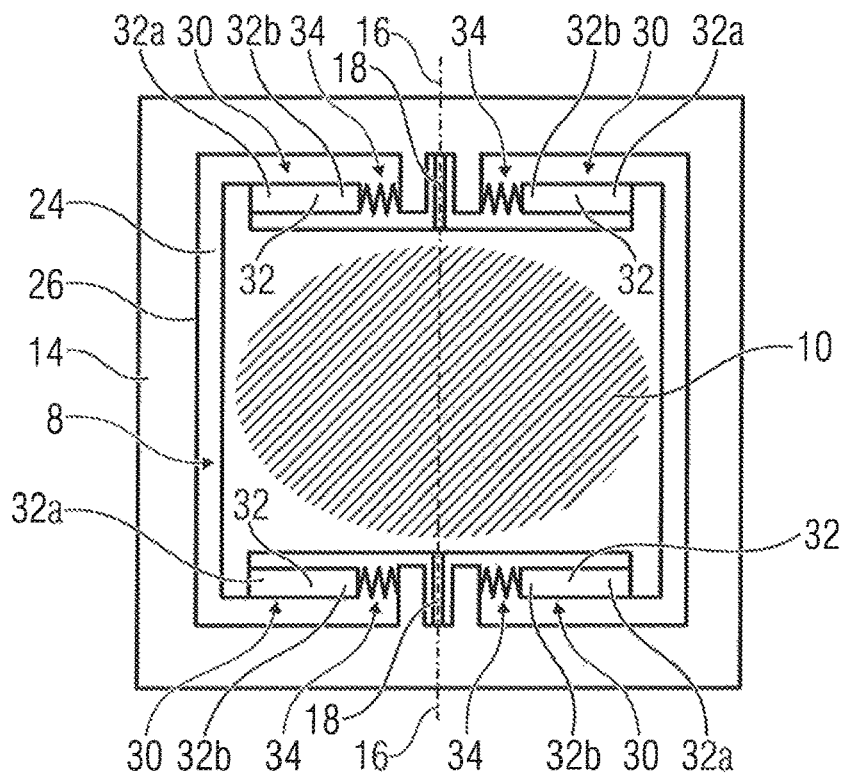

FIG. 13B shows an example of a mirror device comprising at least one leaf spring assembly 30 including the leaf spring 32 and the relief link 34. The second end 32*b* of the leaf spring 32 is connected to its relief link 34 at a location relatively close to the rotation axis 16, and the first end 32*a* of the leaf spring 32 is fixed to the mirror body 8 at a location relatively further away from the rotation axis 16. The second end 32*b* is connected to the frame 14 vie the relief link 34.

Figure 13C:
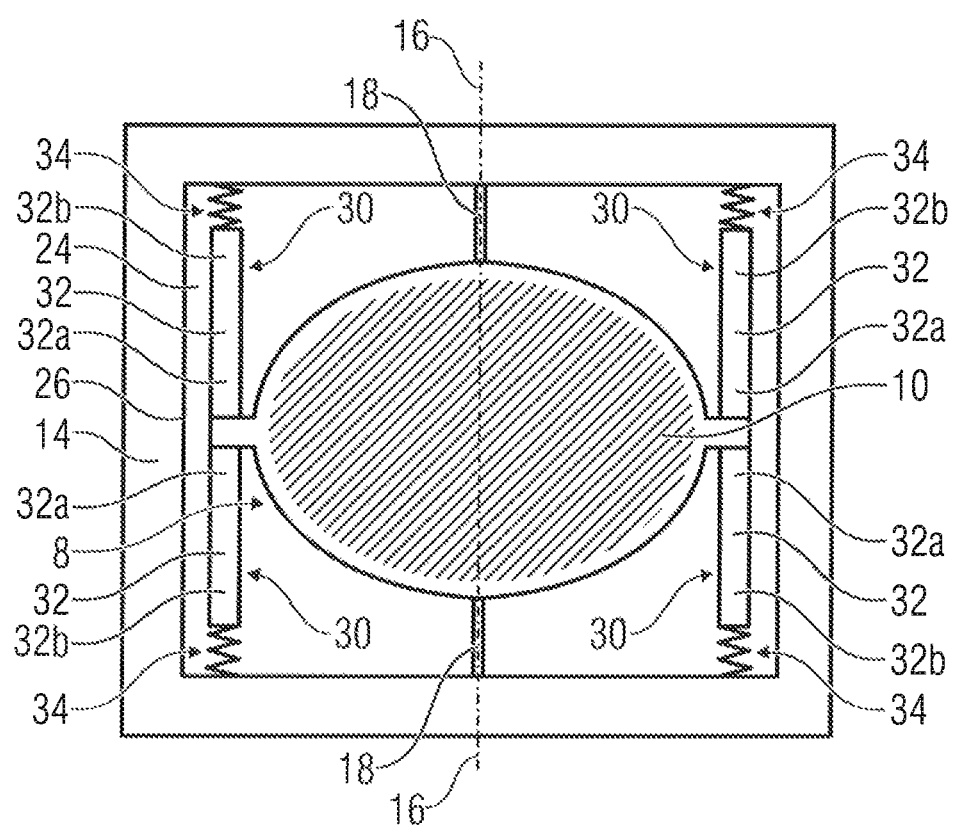

FIG. 13C shows a schematic top view of a mirror device, in which the leaf springs 32 of the leaf spring assemblies 30 are oriented parallel to a rotation axis 16. The first end 32*a* of the at least one leaf spring 32 is fixed to the mirror body 8 and the second end 32*b* of the at least one leaf spring is connected to the frame 14 via the relief link 34. In another example, the at least one leaf spring could be arranged as shown in FIG. 13C, but the first end 32*a* of the leaf spring could be connected to the mirror body 8 via a relief link and the second end 32*b* could be fixed to the frame 14, or the first end 32*a* could be fixed to the frame and the second end 14 could be fixed to the mirror body 8. The example shown in FIG. 13C illustrates that the leaf springs 32 may be oriented other than perpendicular to the rotation axis 16. For example, a parallel arrangement can be used to reduce the overall dimensions of the mirror device, but may lead to torsion of the leaf springs 32 which increases the mechanical stress.

In examples, the mirror device may be formed by a plurality of construction layers. In examples, a first construction layer may have a first thickness, a second construction layer may have a second thickness larger than the first thickness and a third construction layer may have a third thickness larger than the second thickness. In examples, the first construction layer may be an upper construction layer, the second construction layer may be an intermediate construction layer and the third construction layer may be a lower construction layer. The construction layers may be formed of a semiconductor such as silicon. Thin isolating layers may be formed between the construction layers or some of the construction layer. The mirror 10, the leaf springs 32 and parts of the relief links 34 and the actuators 30 may be formed in the first construction layer. Parts of the mirror support 12 having the second thickness may be formed in the second construction layer, as can be seen in FIG. 6, for example. Moreover, parts of the relief links 34 and the actuators 40 may be formed in the second construction layer. Accordingly, the relief link and the actuators may have a thickness in the Z direction which is larger than the thickness of the mirror and the leaf springs. Parts of the mirror support 12, such as support bar 20 and reinforcement beams 22 may be formed in the third construction layer. Parts of the frame 14 may be formed in the first, second and third construction layers, wherein the respective layers are structured to include the recesses shown in FIGS. 1 to 7, such as the mirror recess 24. The support beams 18 may be formed in the first and second construction layers and, there-fore, may have a thickness corresponding to the combined thickness of the first and second construction layer and, if present, any layer between the first and second construction layer.

In examples, the mirror devices may be manufactured from single crystal silicon or polysilicon material using photolithography and DRIE (dry reactive ion etching) techniques. In examples, the mirror device may be manufactured using silicon on insulator (SOI) substrates.

Figure 14:
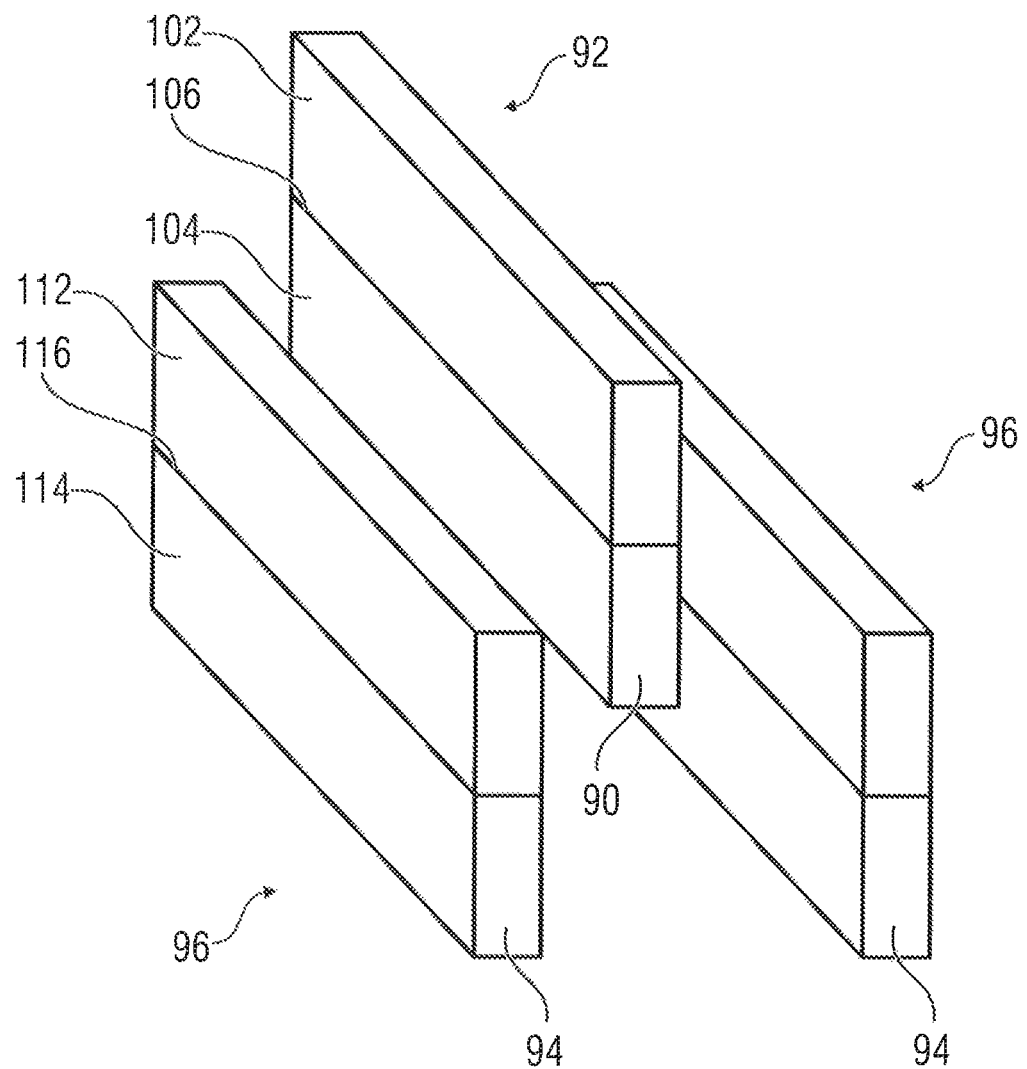
FIG. 14 shows a schematic view for explaining an actuator according to an example.

FIG. 14 is a detailed perspective view of comb fingers for an actuator of an example of a mirror device according to the present disclosure. One comb finger 90 of a mirror comb 92 and two comb fingers 94 of a frame comb 96 are shown in FIG. 14. The comb fingers 90 of the mirror comb 92 are interleaved with the comb fingers 94 of the frame comb 96. In an example, the mirror device can be manufactured from an SOI wafer having an upper silicon layer and a lower silicon layer, with an insulating layer between the upper silicon layer and the lower silicon layer. In examples, the upper silicon layer may be formed by the first construction layer and the lower silicon layer may be formed by the second construction layer. In an example, the mirror comb 92 and the frame comb 96 may be fabricated so that the insulating layer divides the combs parallel to the mirror surface, producing electrically isolated upper electrical portions and lower electrical portions in each of the comb fingers. The comb fingers 90 of the mirror comb 92 include first electrical portions 102 and second electrical portions 104 separated by an insulating layer 106. The comb fingers 94 of the frame comb 96 include first electrical portions 112 and second electrical portions 114 separated by an insulating layer 116.

Applying a difference in electrical potential between the upper electrical portions in the mirror comb 90 and the lower electrical portions in the frame comb 96, or vice-versa, can be used to generate an initial driving force between the mirror combs 92 and the frame combs 96 when the mirror combs 92 and the frame combs 96 are aligned and the mirror body 8 is at rest. The separation of the comb fingers in two (top and bottom) parts allows, by switching between opposed layers, to apply the driving potential (and eventually torque, depending on the comb fingers geometry) for a duration greater than half an oscillation period per oscillation cycle. In an example, the leaf springs can be fabricated in the upper silicon layer of an SOI wafer and can bring the electrical potential to the top first electrical portions of the mirror combs 92. In another example, the leaf springs can be fabricated in the lower silicon layer of the SOI wafer and can bring the electrical potential to the bottom second electrical portions 104 of the mirror combs 92. In another example, the support beams 18 can be fabricated in the lower silicon layer of the silicon on insulator wafer and can bring the electrical potential to the bottom second electrical portions 104 of the mirror combs 92. In another example, the support beams 18 can be fabricated in the upper silicon layer of the SOI wafer and can bring the electrical potential to the top first electrical portions 102 of the mirror combs 92. In yet another example, the support beams 18 can be fabricated in both the lower silicon layer of the SOI wafer and in the upper silicon layer of the SOI wafer, and can bring the electrical potential to both the bottom second electrode portions 104 of the mirror combs 92 and to the top first electrical portions 102 of the mirror combs 92. In an example, the top first electrical portions 102 of the mirror combs 92 are short-circuited with the bottom second electrical portions 104 of the mirror combs 92, by means of a conductive wire, a wire bond, or additional metal deposition.

Figure 15D:
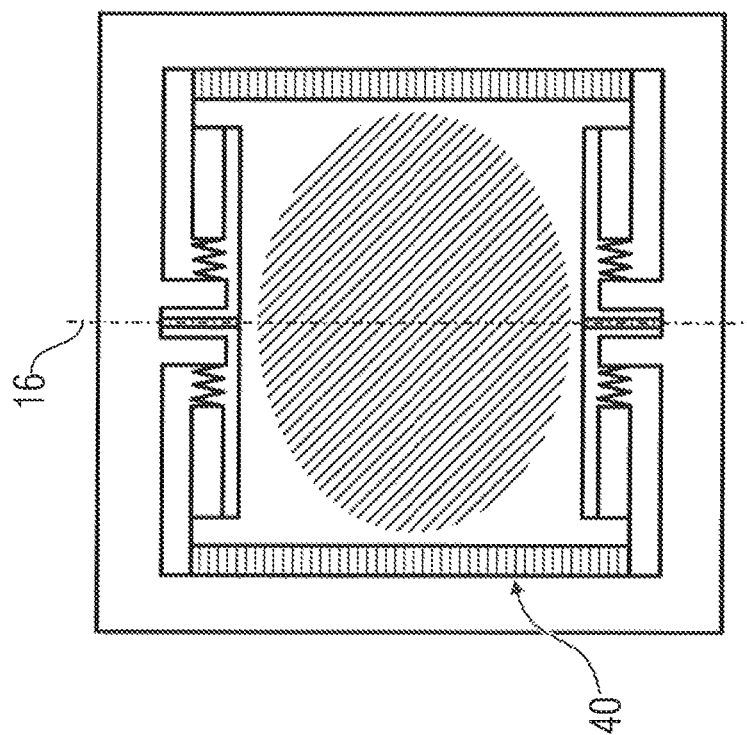
Figure 15C:
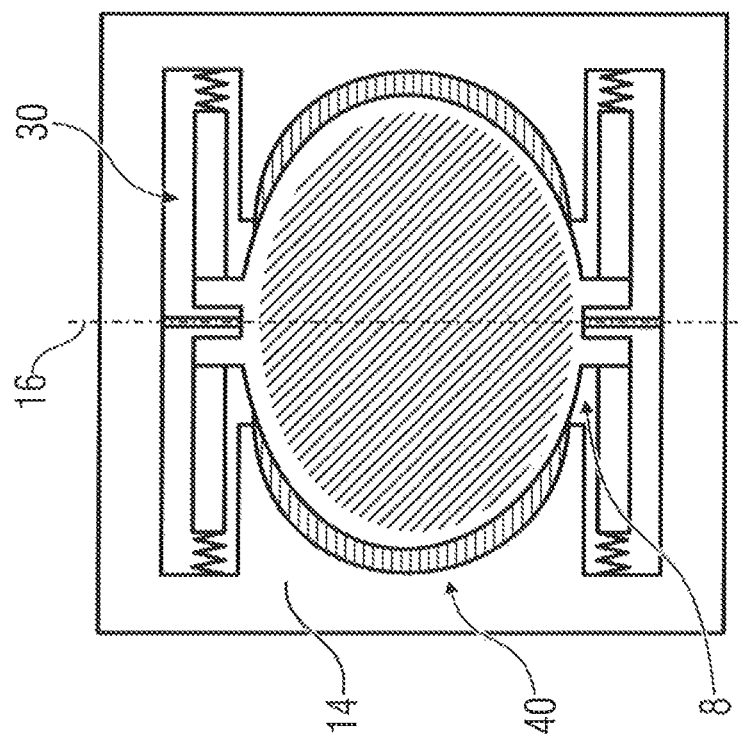

FIGS. 15A to 15D show different examples of mirror devices, each with a different location of the actuator 40. In FIG. 15A, the actuator 40 is located at each side of the mirror body, close to the rotation axis 16, and in between the mirror body and the leaf spring assemblies 30. In FIG. 15B, the actuator 40 is located at each side of the mirror body, close to the rotation axis 16, but in between the leaf spring assemblies 30 and the frame 14. In FIG. 15C, the actuator 40 is curved and located at the circumference of the mirror body 8. In FIG. 15D, the actuator 40 is not curved and located at the circumference of the mirror body 8, but at a larger distance from the rotation axis 16.

Figure 16E:
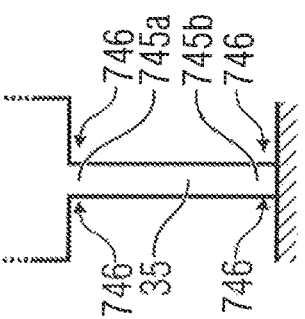
FIGS. 16A to 16E show schematic illustrations of various designs of elastic elements, with either none, small, or large fillets.
Figure 16D:
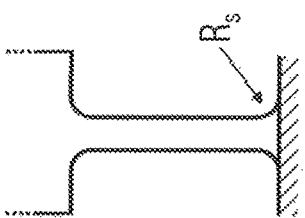
Figure 16C:
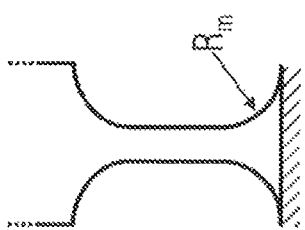
Figure 16B:
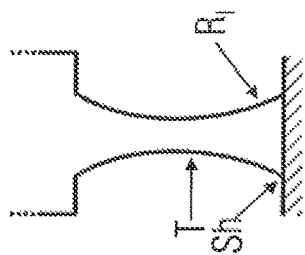
Figure 16A:
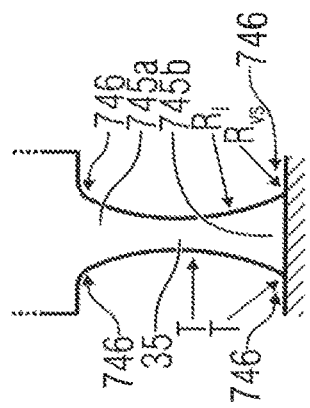

In examples, the mirror device may include at least three different types of compliant elements, i.e. the relief springs 25, the leaf springs 32, and the support beams 18. To improve the mechanical robustness of all these compliant elements, the mechanical stresses may be reduced. Stress concentrations are expected at each of the corners 746, where these stresses can initiate a crack leading to mechanical failure. This is especially the case for sharp corners 746, as illustrated in FIG. 16A. FIGS. 16A to 16E show a relief spring 35 as an example of a compliant element, which has ends 745a and 745b thereof connected to support structures. This can be remedied by adding a fillet at each of the corners, with the fillet commonly having a constant radius Rs and with the fillet commonly being tangential to both edges, FIG. 16B. The larger the radius Rm, the lower the stress concentrations, FIG. 16C. Using a large radius though also adds a lot of additional material which increases stiffness and adds additional area. Both these downsides can be solved by using a fillet with a large radius Rl, which is tangential only to the edge of the compliant element, and not to the edge of the rigid body 742, FIG. 16D. This may reduce stress concentrations significantly while the added stiffness and the additional area are reduced. A sharp corner will result between the fillet and the rigid support structure, which might still introduce some stress concentrations. This however can be remedied by adding a second fillet with a small radius, FIG. 16E. In FIG. 16E, the end 745a of the compliant element 35, has corners 746 that have a radius of curvature Rvs smaller than a radius of curvature Rl with which said at least one element widens towards said end and with an arc less than 90 degrees.

As explained above, the relief link 34 provides some compliance in the longitudinal direction of the leaf springs 32 (X direction in FIG. 1), to reduce tensile strain and stress in the leaf springs 32. Translations should however be suppressed as strongly as possible in the transverse directions of the leaf springs 32 (Z direction and Y direction in FIG. 1) to avoid unwanted motion. The only motion to be allowed is the tilting of the mirror body 8 around the rotation axis 16. The relief link should permit a relatively small longitudinal translation such as a longitudinal translation of less than 30 micrometer. This is much less than the maximum translation of the actuator 40 and the mirror body 8. The relief link can there-fore be designed to be also relatively stiff in longitudinal direction of the leaf springs 32, providing only a small stroke in the longitudinal direction. This allows for a high translational stiffness in the other directions.

FIGS. 17A to 17J show different examples of relief links. According to FIGS. 17A to 17C, the relief link comprises one or more relief springs connected to an end 32b of the leaf spring 32. In order to maintain a high translational stiffness in all directions other than the longitudinal direction and to avoid a compliant connection of the relief link 34 to the leaf spring 32, an additional rigid body 742 may be used in between the relief springs 35 and the leaf spring 32, as shown in FIG. 17D. This rigid body 742 may facilitate the connection of the relief springs 35 to the leaf springs 32. The relief springs 35 may have their thinnest dimension in the longitudinal direction of the leaf springs 32. In this way the relief springs 35 may provide for a high translational stiffness in directions transverse to the longitudinal direction of its associated leaf spring. By way of example, the relief springs 35 shown in FIGS. 9A to 9C may have a smallest thickness in the longitudinal direction (of the leaf springs) of 5 µm while their height, i.e. the dimension in the Z direction may be about 55 µm. For comparison the associated leaf spring 32 may have its thinnest dimension (approximately 10 µm) normal to the plane of the mirror 52 and may have a smallest width in said plane and transverse to its orthogonal direction of approximately 300 µm. The rigid body 742 may be U-shaped, as if it is folded around the end 32b of the leaf spring 32, as shown in FIG. 17E. The leaf spring 32 may be connected to a central portion 743 of the rigid element 742 and the relief springs 35 may be connected to the outer sides of peripheral portions 744 of the U-shaped rigid element 742. This example may be effective in that the relief link occupies a small area at the end 32b of the associated leaf spring 32. In this way more degrees of freedom are available for dimensioning the leaf spring 32 and its relief link 34.

In the examples of FIGS. 17D and 17E, the rigid element 742 has a thickness that is substantially larger, i.e. at least two times as large as a thickness of its associated leaf spring. In examples, this may be realized by implementing the mirror device in several construction layers such as using an SOI wafer. An upper construction layer may have a thickness of approximately 10 µm and a lower construction layer may have a thickness of approximately 300 µm. The construction layers may be separated by an insulating layer having a thickness of approximately 1 µm. The rigid element 742 may be formed in the upper layer, the insulating layer and part of the lower layer, resulting in a thickness of approximately 55 µm, and the associated leaf spring 32 may be formed in the upper layer. Accordingly, in examples, the rigid element 742 may have a thickness that is about 5.5 times that of the leaf spring.

In other examples, such as those depicted in FIGS. 17F and 17G, the relief springs 741 may be zigzag or meander shaped. In FIGS. 17I1 to 17J the relief springs 35 have been rotated by 90 degrees around the X axis.

In order to increase the mechanical robustness of the relief links 34 and to reduce the risk of mechanical failure, the mechanical stresses in the relief springs 35 should be reduced or minimized. This can be realized by increasing the length (in Y direction in FIG. 1), but this compromises the stiffness in Y and Z direction to some extent. Another way to reduce mechanical stresses is to make the relief springs 35 thinner (in X direction in FIG. 1), because for a given displacement, the mechanical bending stresses are related to the thickness of the relief springs 35. To compensate for the loss of stiffness (in all directions), multiple relief springs 35 may be used which are arranged mechanically in parallel, see for example FIGS. 17C to 17E and FIG. 17J. When multiple relief springs 35 are used mechanically in parallel their stiffness adds up, leading to a higher overall stiffness of the relief link. This way the mechanical bending stress in the relief springs 35 can be reduced, without reducing the mechanical stiffness of the relief means 34. At the same time the ratio of the translational stiffness in Z direction (in FIG. 1) over the translational stiffness in X direction can be improved by keeping the length of the relief springs 35 as small as possible, which results in a better suppression of unwanted motion. Also, the rotational stiffness (around an axis parallel to the Y axis, as defined in FIG. 1) at the end of the leaf springs 32 or of the rigid body 742 at the end of the leaf springs 32 can be increased significantly. This is not possible if a single relief spring 35, see FIG. 17A, for example, or multiple collinear relief springs 35, see FIG. 17B, for example, are used.

In examples, the leaf springs 32 are coupled via the relief links 34 to the frame 14. Thus, the leaf springs 32 are allowed to contract and expand in their longitudinal direction while avoiding an increase in the rotational inertia of the mirror body 8. In other examples, relief links 34 may be provided to connect the leaf springs to the mirror body. In examples, relief links 34 may be provided to connect a leaf spring to both, the frame 14 and the mirror body 8.

Figure 18:
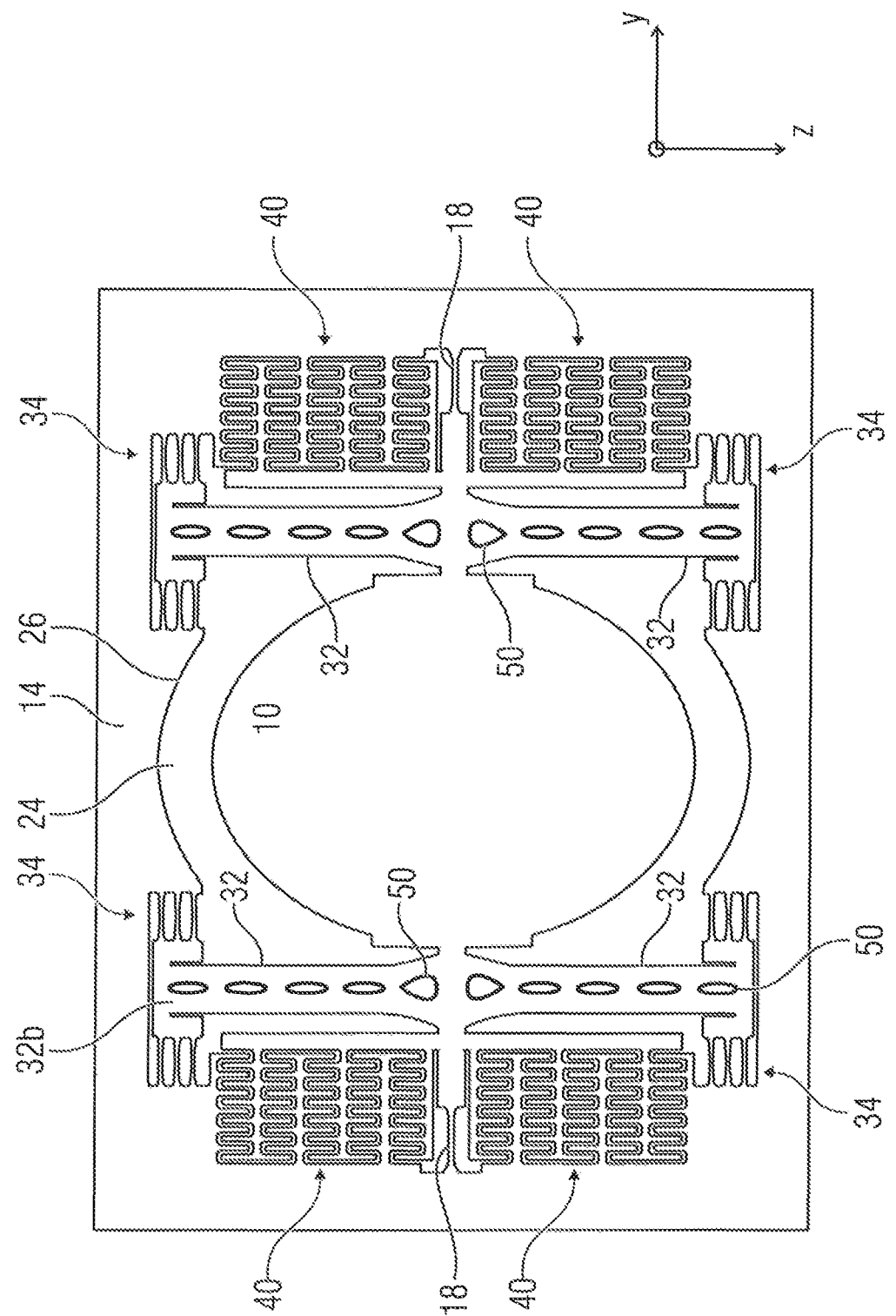
FIG. 18 shows a schematic top view of another example of a mirror device according to the present disclosure.

FIG. 18 shows a schematic top view of another example of a mirror device. In the example shown in FIG. 18, the second end 32b of the leaf spring 32 is not widened. The relief link comprises relief springs on both sides of the respective leaf spring 32. Openings 50 are formed in the at least one leaf spring 32. The openings are shown in FIG. 18 in a merely schematic manner. In other examples, the leaf spring may have a rectangular shape in a plan view.

In examples, the mirror device includes a driver to magnetically or electrically apply a torque to the mirror body about the scanning axis without physical contact with the mirror body to drive the mirror body at a resonance frequency. In examples, the actuator is an electrostatic comb-drive actuator, having a pair of mutually cooperating combs of which a first one is rigidly connected to the mirror body and a second one is rigidly connected to the frame. In examples, the actuator has at least one additional pair of mutually cooperating combs, of which a first one is rigidly connected to the mirror body and a second one is rigidly connected to the frame, wherein said at least one additional pair of combs is arranged at a distance from the rotation axis that is smaller or larger than the distance between the pair of mutually cooperating combs and the rotation axis.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

In the foregoing detailed description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus the following claims are hereby incorporated into the detailed description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or in-dependent claims Such combinations are proposed herein unless it is stated that a specific combination is not intended. Furthermore, it is intended to include also features of a claim to any other independent claim even if this claim is not directly made dependent to the in-dependent claim.

The above described examples are merely illustrative for the principles of the present disclosure. It is understood that modifications and variations of the arrangements and the details described herein will be apparent to others skilled in the art. It is the intent, there-fore, to be limited only by the scope of the impending patent claims and not by the specific details presented by way of description and explanation of the examples herein.

What is claimed is:

1. A mirror device comprising:
   a frame;
   a mirror body arranged in the frame and rotatable around a rotation axis;
   support beams connected between the mirror body and the frame; and
   a leaf spring providing torsional stiffness with respect to a rotation of the mirror body around the rotational axis,
   wherein the leaf spring has a maximum thickness that is smaller than a minimum width of the leaf spring,
   wherein the leaf spring has openings that reduce the thickness of the leaf spring or that penetrate the leaf spring in a thickness direction of the leaf spring,
   wherein the openings are completely surrounded by material of the leaf spring when viewed in the thickness direction of the leaf spring, and
   wherein a first end of the leaf spring is coupled to the mirror body and a second end of the leaf spring is coupled to the frame, wherein the openings comprise an opening arranged closer to the first end than to the second end.

2. The mirror device of claim 1, wherein at least one of the openings has an extension in a width direction of the leaf spring that is less than the minimum width of the leaf spring.

3. The mirror device of claim 1, wherein the openings comprise at least three openings.

4. The mirror device of claim 1, wherein the openings are distributed over a region covering 50% or more of an area of the leaf spring when viewed in the thickness direction of the leaf spring.

5. The mirror device of claim 1, wherein the openings comprise at least two openings of different shapes and/or different areas when viewed in the thickness direction of the leaf spring.

6. The mirror device of claim 1, wherein the openings occupy a percentage of an area of the leaf spring when viewed in the thickness direction of the leaf spring in a range of 20% to 90%.

7. The mirror device of claim 1, wherein the openings are arranged to reduce the torsional stiffness with respect to the rotation of the mirror body around the rotational axis more than a torsional stiffness with respect to rotations around axes perpendicular to the rotational axis.

8. The mirror device of claim 1, wherein the openings are arranged to provide a truss structure of the leaf spring.

9. The mirror device of claim 1, wherein the openings comprise openings arranged with at least one of a cross-shaped, a y-shaped, or an x-shaped land between them.

10. The mirror device of claim 1, wherein, when viewed in the thickness direction of the leaf spring, the openings comprise triangular openings.

11. The mirror device of claim 10, wherein, when viewed in the thickness direction of the leaf spring, fillets are formed in corners of the openings and the openings do not include acute corners.

12. The mirror device of claim 1, wherein the openings comprise longitudinal rectangular openings extending in a longitudinal direction between a first end of the leaf spring and a second end of the leaf spring.

13. The mirror device of claim 12, wherein pairs of the longitudinal rectangular openings are formed side by side in a width direction in a portion of the leaf spring having a smaller width than other portions of the leaf spring.

14. The mirror device of claim 1, wherein:
the mirror body comprises a mirror support and a mirror arranged on the mirror support,
the mirror support comprises a support bar, and
the leaf spring is fixed to the support bar outside of the mirror when viewed in the thickness direction of the leaf spring.

15. A mirror device comprising:
a frame;
a mirror body arranged in the frame and rotatable around a rotation axis;
support beams connected between the mirror body and the frame;
a leaf spring providing torsional stiffness with respect to a rotation of the mirror body around the rotational axis,
wherein the leaf spring has a maximum thickness that is smaller than a minimum width of the leaf spring,
wherein the leaf spring has openings that reduce the thickness of the leaf spring or that penetrate the leaf spring in a thickness direction of the leaf spring,
wherein the openings are completely surrounded by material of the leaf spring when viewed in the thickness direction of the leaf spring; and
at least one leaf spring assembly comprising the leaf spring and a relief link,
wherein the leaf spring has a first end, a second end, and a longitudinal direction between the first end and the second end, and
wherein the first end is fixed to the mirror body and the second end is coupled to the frame by the relief link, or the first end is coupled to the mirror body by the relief link and the second end is fixed to the frame, and
wherein the relief link allows for a translation of the leaf spring in the longitudinal direction at the first end or the second end that is adjacent to the relief link.

16. A mirror device comprising:
a frame;
a mirror body arranged in the frame and rotatable around a rotation axis;
support beams connected between the mirror body and the frame; and
a first pair of leaf springs and a second pair of leaf springs, the leaf springs in each pair extending from the mirror body in opposite directions,
wherein each leaf spring provides torsional stiffness with respect to a rotation of the mirror body around the rotational axis,
wherein each leaf spring has a maximum thickness that is smaller than a minimum width of the leaf spring,
wherein each leaf spring has openings that reduce the thickness of the leaf spring or that penetrate the leaf spring in a thickness direction of the leaf spring, and
wherein the openings of each leaf spring are completely surrounded by material of the leaf spring when viewed in the thickness direction of the leaf spring.

17. The mirror device of claim 1, A mirror device comprising:
a frame;
a mirror body arranged in the frame and rotatable around a rotation axis;
support beams connected between the mirror body and the frame; and
a leaf spring providing torsional stiffness with respect to a rotation of the mirror body around the rotational axis,
wherein the leaf spring has a maximum thickness that is smaller than a minimum width of the leaf spring,
wherein the leaf spring has openings that reduce the thickness of the leaf spring or that penetrate the leaf spring in a thickness direction of the leaf spring,
wherein the openings are completely surrounded by material of the leaf spring when viewed in the thickness direction of the leaf spring, and
wherein the leaf spring comprises a first end, a second end, and a width that increases from a middle portion thereof towards the first end coupled to the mirror body and towards the second end coupled to the frame, wherein the width of the leaf spring at the first end is larger than the width of the leaf spring at the second end.

18. A mirror device comprising:
a frame;
a mirror body arranged in the frame and rotatable around a rotation axis extending in a plane defined by the frame;
support beams connected between the mirror body and the frame along the rotation axis; and
a leaf spring providing torsional stiffness with respect to a rotation of the mirror body around the rotational axis, the leaf spring having a first end, a second end, and a longitudinal direction between the first end and the second end, the first end being coupled to the mirror body and the second end being coupled to the frame,
wherein the leaf spring has a maximum thickness, perpendicular to the plane, that is smaller than a minimum width of the leaf spring, in the plane, and wherein the leaf spring has openings that reduce the thickness of the leaf spring or that penetrate the leaf spring in a thickness direction of the leaf spring.

19. The mirror device of claim 18, wherein the openings comprise openings having in the longitudinal direction of the leaf spring a larger extension than in a width direction of the leaf spring.

20. The mirror device of claim 18, wherein the first end of the leaf spring is fixed to the mirror body, and wherein the second end of the leaf spring does not include recessed portions or the openings.

21. The mirror device of claim 18, wherein the openings are arranged to reduce the torsional stiffness with respect to the rotation of the mirror body around the rotational axis more than a rotational stiffness with respect to rotations around axes perpendicular to the rotational axis.

22. The mirror device of claim 18, wherein the openings are arranged to provide a truss structure of the leaf spring.

23. The mirror device of claim 18, wherein the openings comprise openings arranged with a cross-shaped or an x-shaped land between them.

24. The mirror device of claim 18, wherein, in a plan view, the openings comprise triangular openings.

25. The mirror device of claim 24, wherein, in the plan view, fillets are formed in corners of the openings.

* * * * *

UNITED STATES PATENT AND TRADEMARK OFFICE
CERTIFICATE OF CORRECTION

PATENT NO. : 10,877,263 B2
APPLICATION NO. : 16/174519
DATED : December 29, 2020
INVENTOR(S) : Hendrikus Van Lierop and Kaveh Samadi Khah It is certified that error appears in the above-identified patent and that said Letters Patent is hereby corrected as shown below:

In the Claims

In Column 18, Line 28; Claim 17: delete "The mirror device of claim 1,".

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*